(12) United States Patent
Pauly et al.

(10) Patent No.: US 6,845,378 B1
(45) Date of Patent: Jan. 18, 2005

(54) INTEGRATED DATA BANK COMBINING SYSTEM

(75) Inventors: Heinz Pauly, Ludwigshafen (DE); Rainer Brendle, Neckargemünd (DE)

(73) Assignee: SAP Aktiengesellschaft, Waldorf (DE)

( * ) Notice: Subject to any disclaimer, the term of this patent is extended or adjusted under 35 U.S.C. 154(b) by 342 days.

(21) Appl. No.: 09/857,864

(22) PCT Filed: Oct. 11, 2000

(86) PCT No.: PCT/EP00/09973
§ 371 (c)(1),
(2), (4) Date: Jun. 12, 2001

(87) PCT Pub. No.: WO01/27806
PCT Pub. Date: Apr. 19, 2001

(30) Foreign Application Priority Data

Oct. 14, 1999 (EP) .............................. 99120009

(51) Int. Cl.$^7$ .......................... G06F 12/00; G06F 17/00
(52) U.S. Cl. ........................ 707/101; 707/100; 707/1; 711/202
(58) Field of Search .............................. 707/1–4, 7, 10, 707/100–101, 103 R, 2, 200, 205; 711/202, 210

(56) References Cited

U.S. PATENT DOCUMENTS

| | | | |
|---|---|---|---|
| 4,714,995 A | 12/1987 | Materna et al. | |
| 5,778,373 A | 7/1998 | Levy et al. | |
| 5,870,765 A | 2/1999 | Bauer et al. | |
| 5,873,096 A | 2/1999 | Lim et al. | |
| 5,937,402 A | * 8/1999 | Pandit | .......................... 707/4 |
| 2001/0018690 A1 | * 8/2001 | Ng et al. | ................ 707/103 Y |

FOREIGN PATENT DOCUMENTS

| | | |
|---|---|---|
| EP | 0 592 045 A1 | 4/1994 |
| WO | WO93/04436 | 3/1993 |

OTHER PUBLICATIONS

J. Gray et al., "The Dangers of Replication and a Solution", 1996 ACM SIGMOD International Conference on Management of Data, pp. 173–182, Jun. 1996.

L.B. Huston, et al., "Disconnected Operation for AFS", Proceedings of the USENIX, Mobile and Location–Independent Computing Symposium, pp. 1–10, (1993).

* cited by examiner

Primary Examiner—Alford Kindred
(74) Attorney, Agent, or Firm—Fish & Richardson P.C.

(57) ABSTRACT

Companies and other organizations store extensive datasets having overlapping data contents in different data base systems whose data base structures are incompatible with one another. The invention is concerned with the integration of such structurally incompatible data base systems, in particular with the data interchange between such systems. Various procedures are proposed which serve the purpose of combining such data base systems together such that problem-free data interchange is possible in both directions. In particular, the invention allows data shared across the system to be entered and changed in the different systems.

45 Claims, 14 Drawing Sheets

INTEGRATED DATA BANK COMBINING SYSTEM

Figure 1:
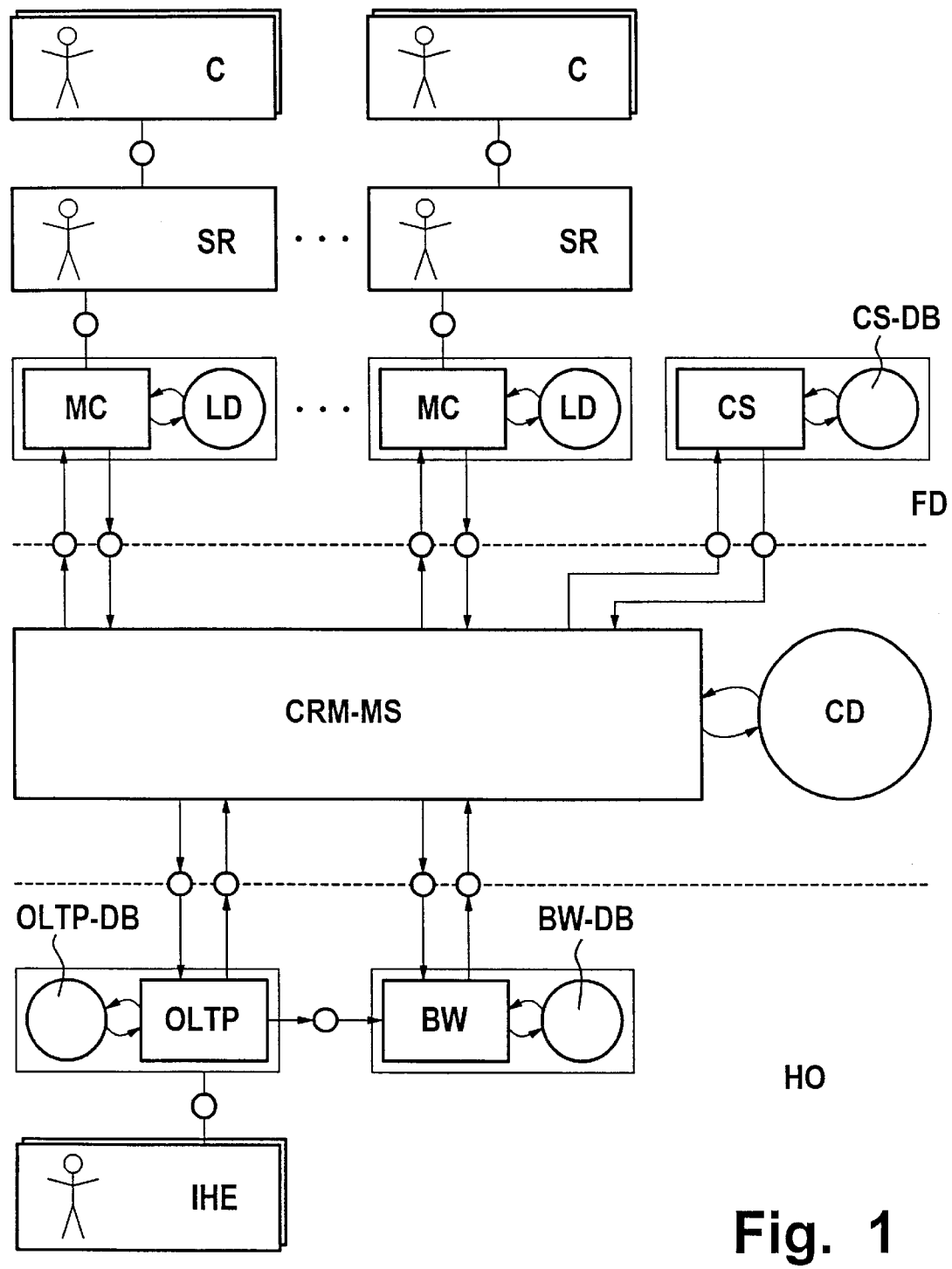

The invention relates to the integration of different structurally incompatible data base systems.

Data base systems play a large part in numerous applications in electronic data processing. They usually comprise the actual data base and a data base management system. They are often the foundation for extensive computer applications in which the data stored in the data base are processed further in a variety of ways.

An important example in the area of company EDP are 'ERP' (enterprise resource planning) systems, such as OLTP-R/3 from SAP AG, Walldorf, Germany. They permit EDP support for a very wide variety of company divisions, such as personnel, sales and distribution, storage, etc., on the basis of a common central data base. Such systems are commonly called "back-office systems".

Another important example of data base systems are customer support systems, which are commonly called SFA (sales force automation) or CRM (customer relation management) systems. Such systems are tailored especially to the EDP requirements of customer advice, customer support, and sales and distribution. This allows for sales representatives of the company to be equipped with a portable computer which, as a 'mobile client' of the data base system, provides an individual local data base containing the data required by the respective sales representative (for example relating to the customers from his area or to the status of the sales which he has made). Such a system (which is commonly called a front-office system) has an associated central computer which likewise contains a data base storing all of the data of the mobile clients. Hence, this is an offline-distributed data base system. Besides the mobile clients, other external systems can also communicate with the central computer of the CRM system, such as customers' EDP systems, which are connected to the central computer via temporary or permanent data links.

Both customary back-office systems and customary front-office systems are extraordinarily complex. They each require powerful methods to ensure that the various components are able to communicate, to ensure data integrity and data synchronization, bearing in mind that communication can involve very large numbers of users.

While these problems have largely been solved for extensive systems of the aforementioned type, there are still no convincing procedures for combining together data base systems which are structurally incompatible but largely manage the same (business) data. By way of example, ERP systems normally store extensive datasets relating to the company's customers (e.g., addresses, contacts, data relating to finished orders, purchasing conditions, or else the customers' machine equipment, which is important for the supply of replacement parts). Largely concurrent datasets are also required in CRM systems. In practice, however, the two systems have a very different, mutually incompatible data base structure.

By way of example, pricing is a task which is performed in different applications with the assistance of EDP. Although a standard business procedure (for example taking into account the production costs, the quantity, the transport costs and any special conditions) forms the foundation, the implementation in different data base systems is frequently entirely different, i.e., the algorithms ("business logic") which are used to implement the business transactions, are very different. However, there is naturally the requirement for it to be possible to handle pricing as consistently as possible in different systems and for it to produce the same result.

The invention is concerned with the problem of fusing together such structurally incompatible data base systems in such a way that problem-free data interchange is possible in both directions. In this context, "combination" of systems should be understood as meaning that—beyond the connection at a technical level—data synchronization is possible and the control logic can be interchanged such that the various systems behave in approximately the same way. Such fusion to form an integrated composite system comprising a plurality of subsystems is also called "semantic system integration" in this case. Amongst other things, it requires:

secure technical connection of the systems, synchronization of the user data in the combined systems, synchronization of customization (customizing data) for controlling the combined systems, suitable conflict-resolution procedures in the event of divergent data changes or other data inconsistencies.

To produce a stable link both online and offline, tried-and-tested hardware and software technologies are available. In this context, an important role is played by queueing mechanisms, which ensure that each data unit is transmitted precisely once (guaranteed delivery) and the data are transmitted in an exactly stipulated order (in-order processing). This partial aspect of semantic system integration need not be explained in any more detail.

By contrast, satisfying the other requirements mentioned presents a very difficult problem, especially since it can generally be assumed that different data base systems can be part of different software product "worlds". The invention is based on the object of providing system components and procedures for solving these problems.

The data models for various data base systems are different. For this reason, their data structures need to be mapped onto one another. In addition, the data contents need to be matched appropriately (e.g. the choice of term "customer" in one system corresponds to "buyer" in another system). These two functions are standard specifications for data interchange between two incompatible systems. Conventional system links are limited to this type of connection. This means that data which must be applied in the entire composite system can be newly entered only in one of the systems, which is designated as central system, with an effect on the entire composite data base system. In many cases, however, for example when a CRM system is fused with an ERP system, this is not satisfactory, because in this case significant new data are obtained both in the head office of the company (that is to say in the ERP system) and within the context of customer support (that is to say in the CRM system) and, having been newly entered, need to be available in the entire composite system.

When data which are shared across the system (that is to say, available in all subsystems of the composite system once they have been newly entered) must be able to be newly entered in any subsystem of the composite system, this requires a unique primary key for identifying the data objects to be available across the system at all times. It is known practice to create such primary keys by allocating number ranges or by allocating GUID (global unified identifier) keys. The two procedures cannot be applied universally, however.

The allocation of number ranges requires identical algorithms for key generation in the data base systems involved. This cannot be ensured in systems from different manufacturers. Even in different systems from the same manufacturer, different key generation procedures are frequently implemented.

Creation of a unique key using GUIDs can be applied only if all the systems involved use the GUID procedure. This can not be ensured in many cases, either.

In accordance with a first aspect of the invention, to solve the resultant problem, a procedure is proposed for interchanging data between two data base systems A and B, where, for the unique identification of stored data objects, each of the data base systems uses a primary-key creation logic to generate a system-specific primary key for each data object, and the primary-key creation logics of the two data base systems A and B are independent of one another, in which, to permit data objects transported from a source data base system A to a destination data base system B to be uniquely identifiable, which is necessary for new entries shared across the system, the following steps are carried out:

a) the primary key for data objects which are to be transported from the source data base system A to the destination data base system B is compared, using a primary key generator, with a key mapping table which contains the primary keys for all data objects for which both primary keys have already been generated;

b) if the primary key is not yet available in the key mapping table, a primary key of the destination data base system B is automatically created, is stored in the data object and is stored in the key mapping table KMT together with the primary key of the source data base system A;

c) if the primary key of the source data base system A was found in the key mapping table, the corresponding primary key of the destination data base system B is stored in the data object.

This means that it is possible to create a primary key which is unique across the system (and hence to make new entries which are shared across the system) even in cases in which each data base system involved uses its own primary key creation logic, and these logics are not matched to one another. The key logics are defined in the control data memory (repository) of the systems involved. The key generator is used to map the two logics onto one another.

In accordance with a second aspect, the object of the invention is a procedure for updating the dataset in a second data base system B as a result of changes which have been made in the dataset in a first data base system A, where the dataset of the first data base system A contains both data which are not relevant to the second data base system B and data which are relevant to the second data base system B, the data in the data base systems are processed in the form of data objects which each contain a system-specific primary key and the data in the second data base system B are stored with the two system-specific primary keys, in which at least some of the following procedural steps are carried out:

a) the data $D_{R/3}$ which are not relevant to the second data base system B are removed from the data object;

b) the data object is transferred from the first data base system A to the second data base system B;

c) a key which is specific to the data base system B is created, and the created key is added to the data object, and d) the data object produced is put into the storage routine of the second data base system B, and the data contained in the data object are stored in the data base of the second data base system B.

Preferably, all of steps a) to d) are carried out.

In accordance with another aspect, the object of the invention is a procedure for updating the dataset in a first data base system A as a result of changes which have been made in the dataset in a second data base system B, where the dataset of the second data base system B contains both data which are not relevant to the first data base system A and data which are relevant to the first data base system A, the data in the data base systems are processed in the form of data objects which each contain a system-specific primary key, and the data are stored in the first data base system A only with the system-specific primary key thereof, in which at least some of the following procedural steps are carried out:

a) the data DMS which are not relevant to the first data base system A are removed from the data object, and these data are parked in the second data base system B;

b) the data object is transferred from the second data base system B to the first data base system A;

c) the system-specific key for the second data base system B is removed from the data object, and this key is parked in the first data base system A;

d) the data object produced is put into the storage routine of the first data base system A, and the data contained in the data object are stored in the data base of the first data base system A.

Preferably, all of steps a) to d) are carried out.

In accordance with yet another aspect of the invention, a procedure is proposed for entering or changing data in a composite system comprising a plurality of data base systems, in which, to prevent data conflicts in the context of the shared new entry of data in any one of the data base systems in the composite system, one of the data base systems is defined as managing system FS for each data object which can be interchanged between the data base systems, and, for each new entry or change in a managed system GS of data in the data object which is also part of the dataset of the managing system FS, a cross-system confirmation algorithm is executed, in which a) a data object containing the change is transported to the managing system FS, b) the managing system FS creates an acknowledgement in the form of a confirmation or at least partial rejection of the change, and c) a data object containing the acknowledgement is transported back to the managed system GS.

Figure 2:
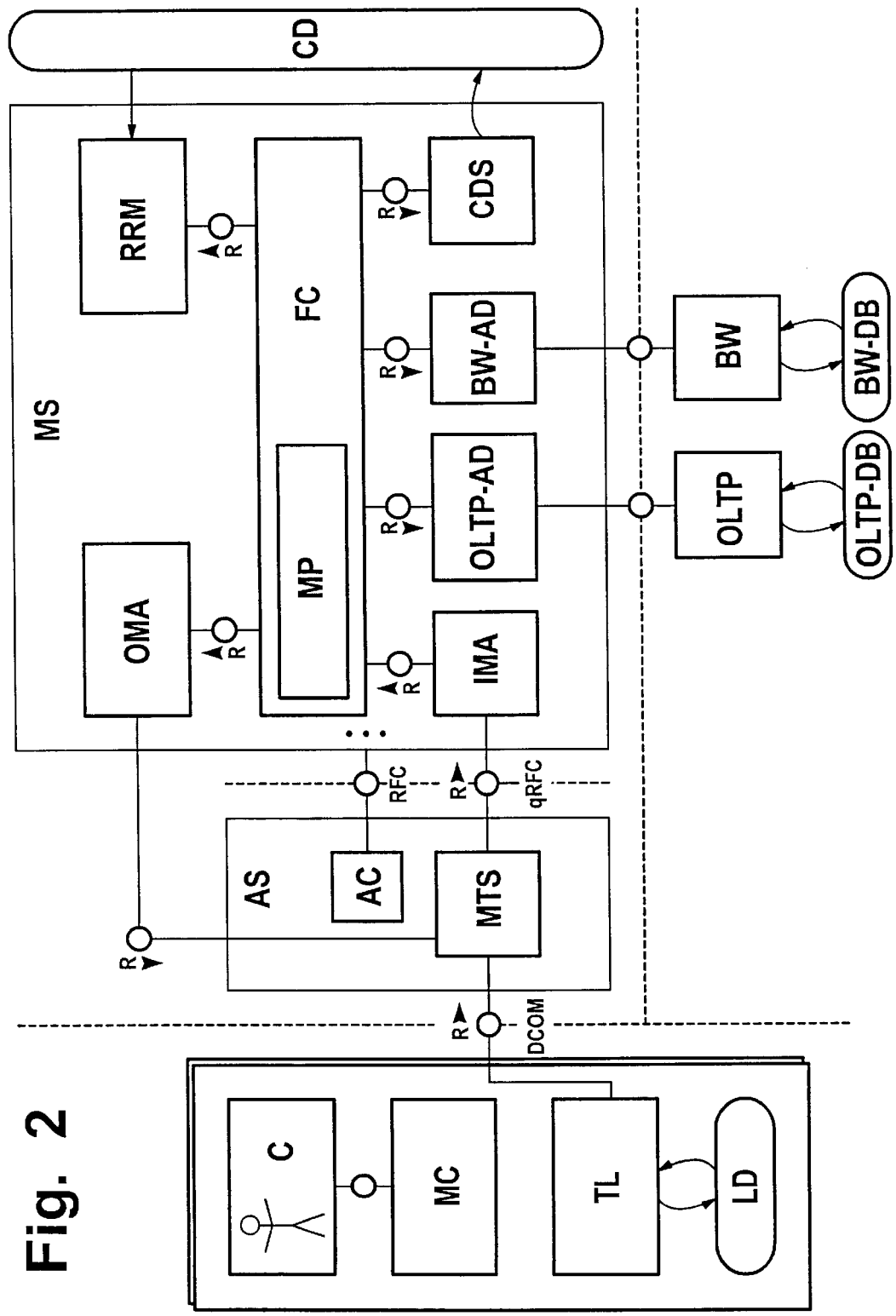
Figure 3:
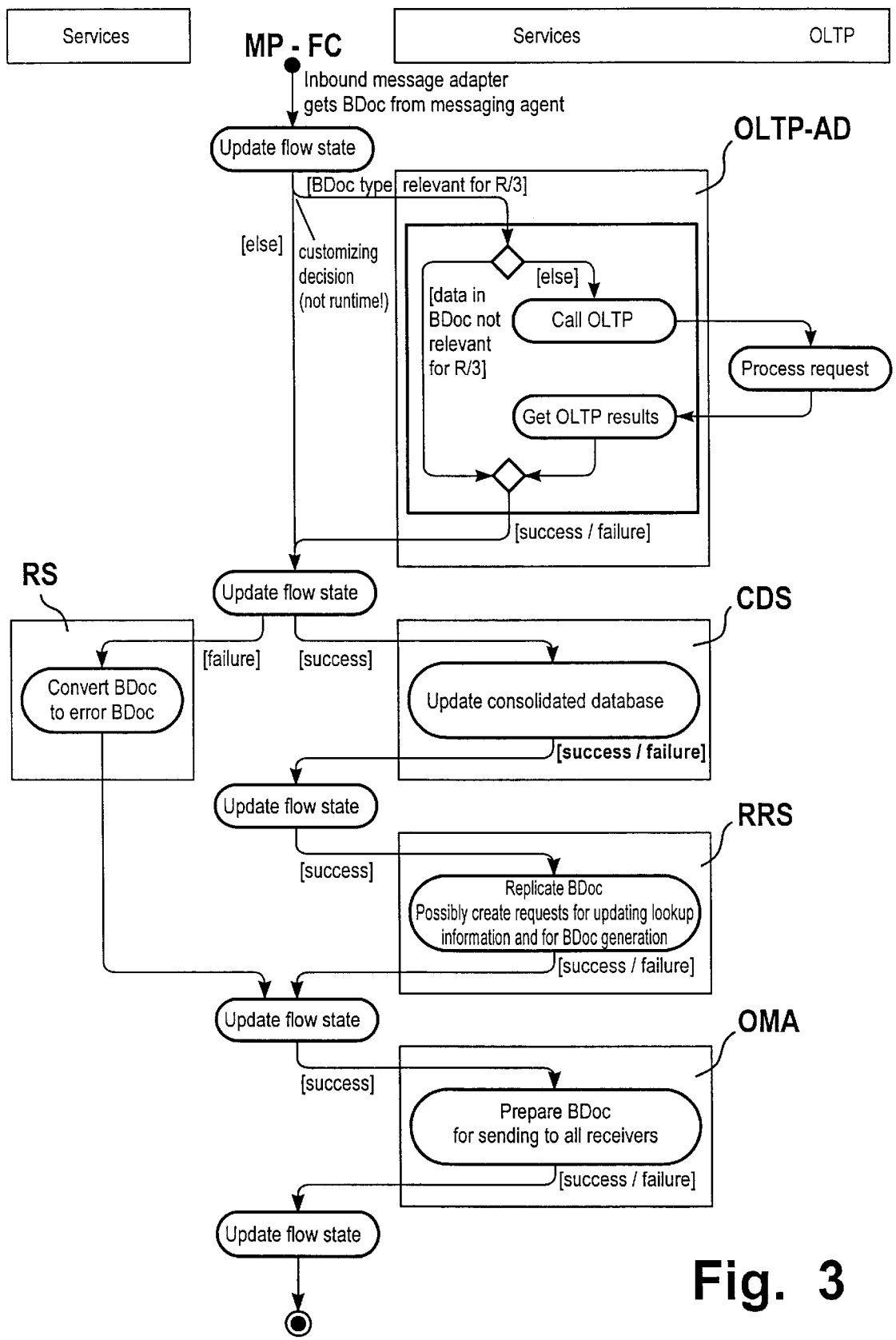
Figure 4:
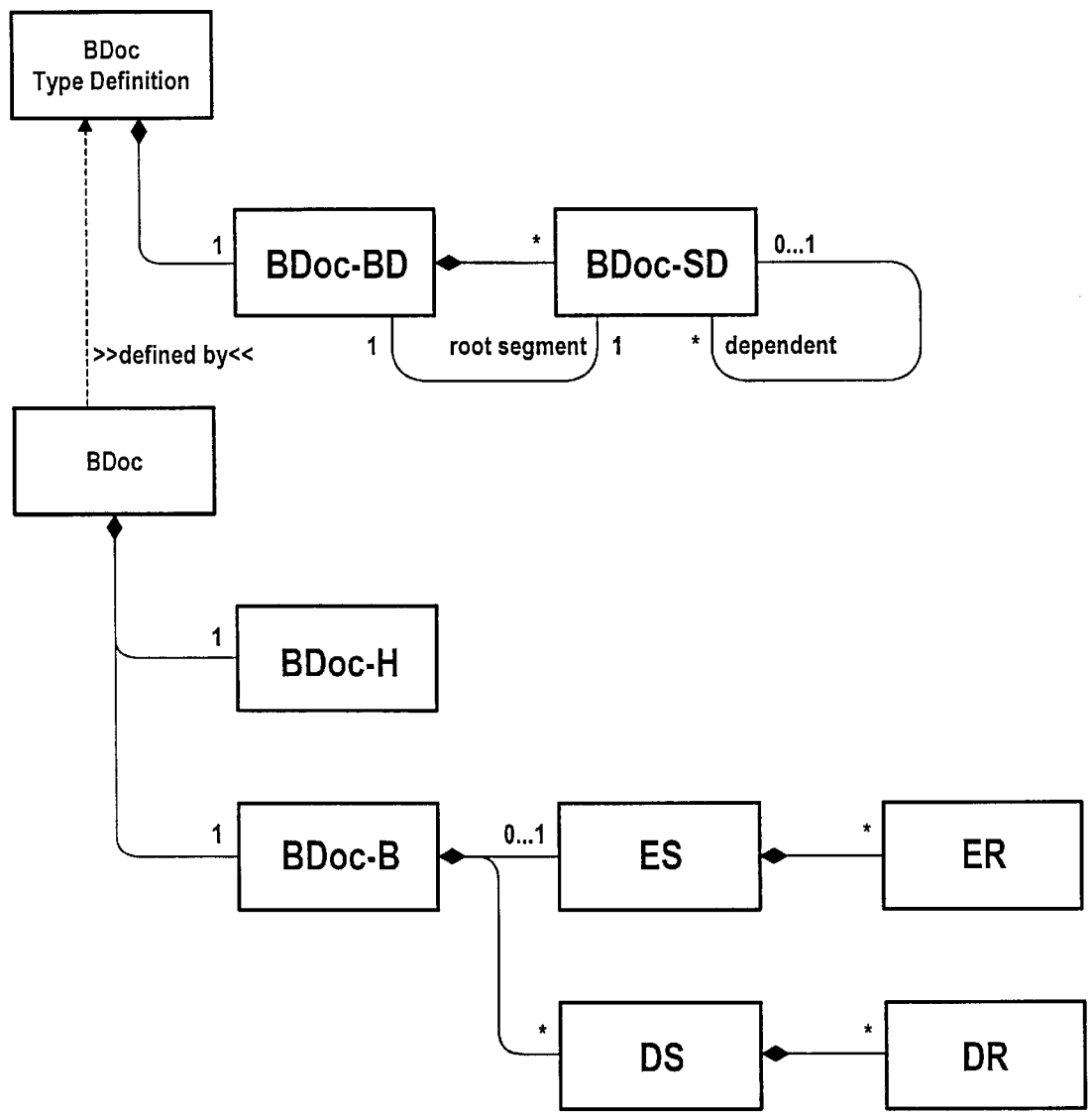
Figure 5:
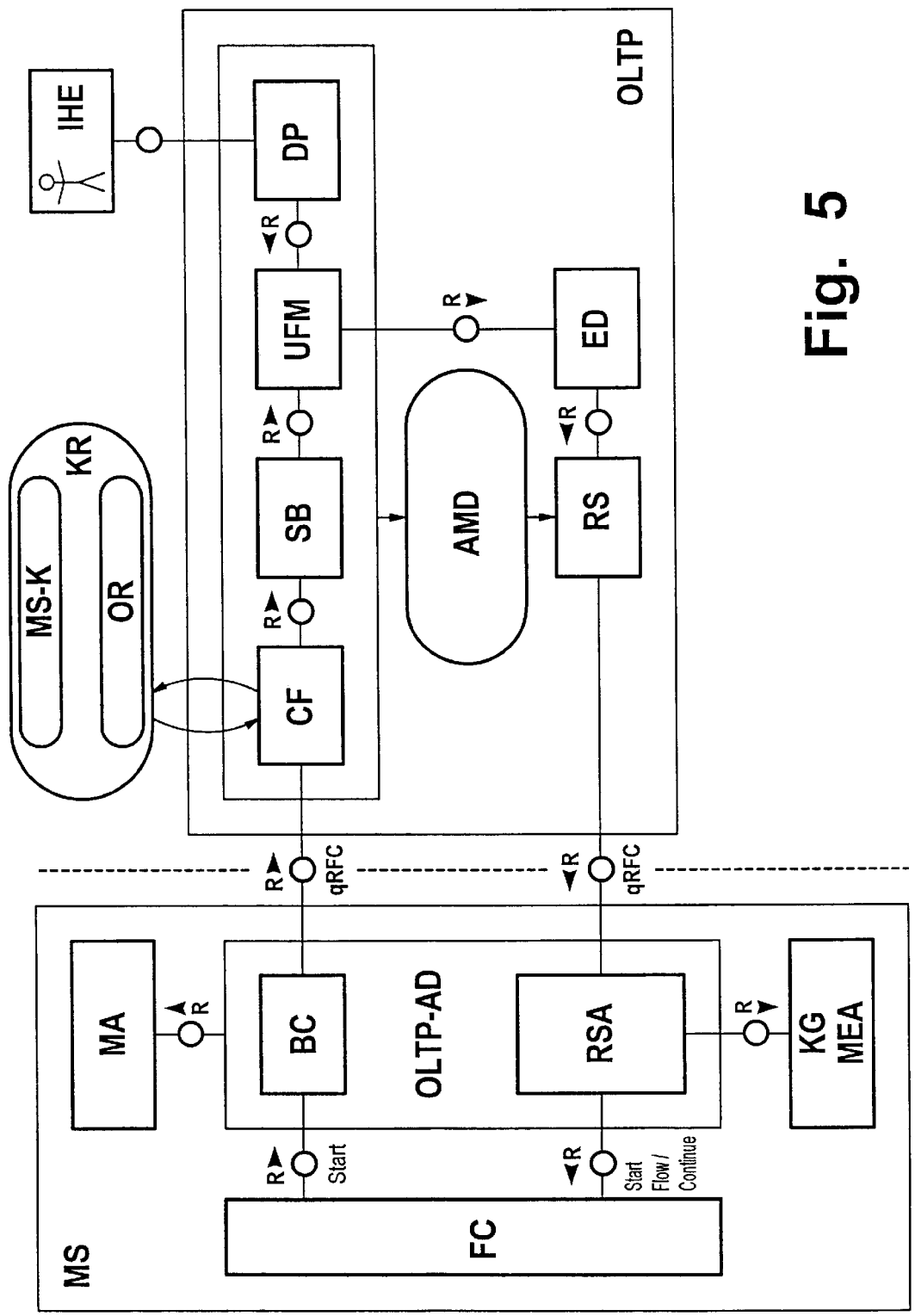
Figure 6:
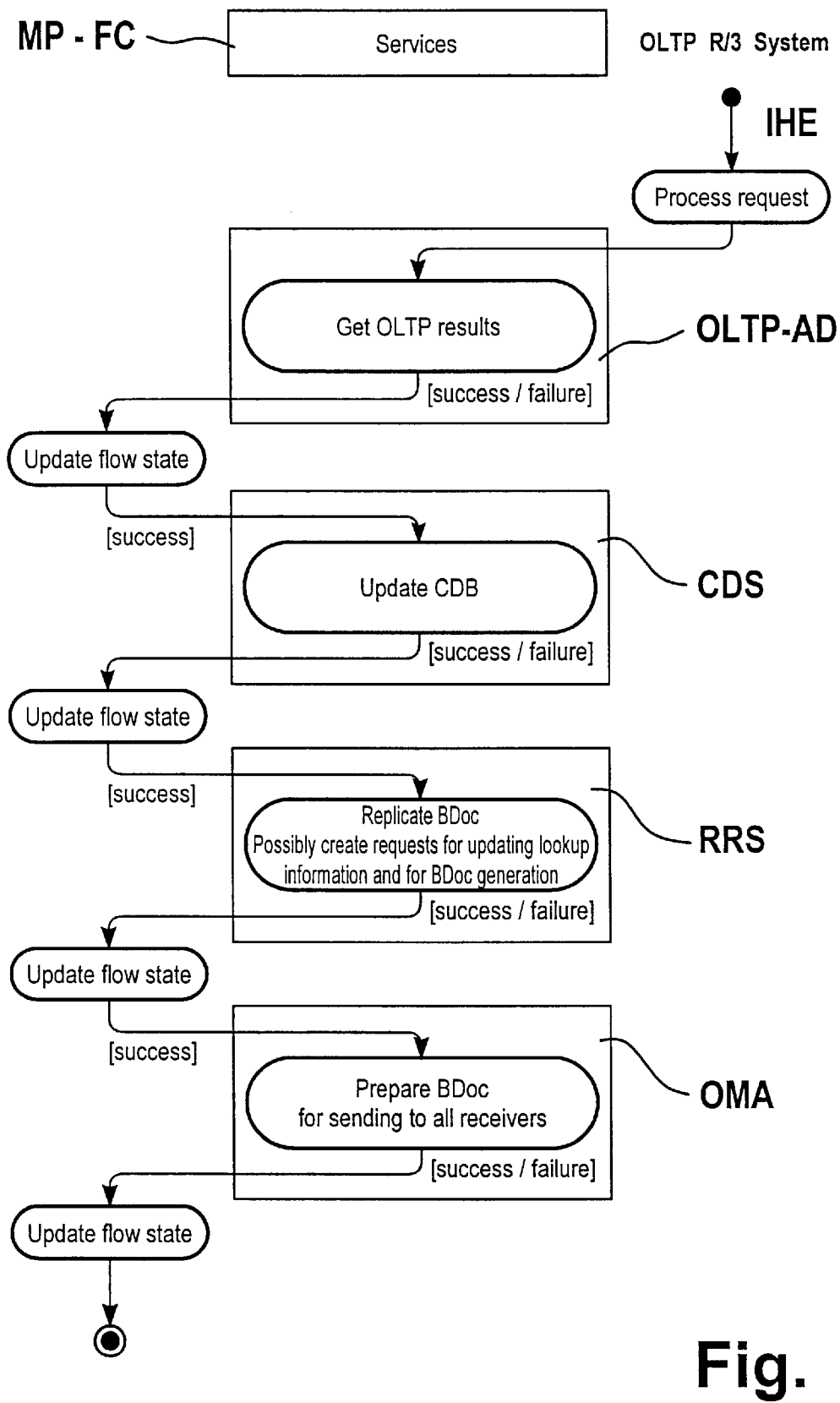
Figure 7:
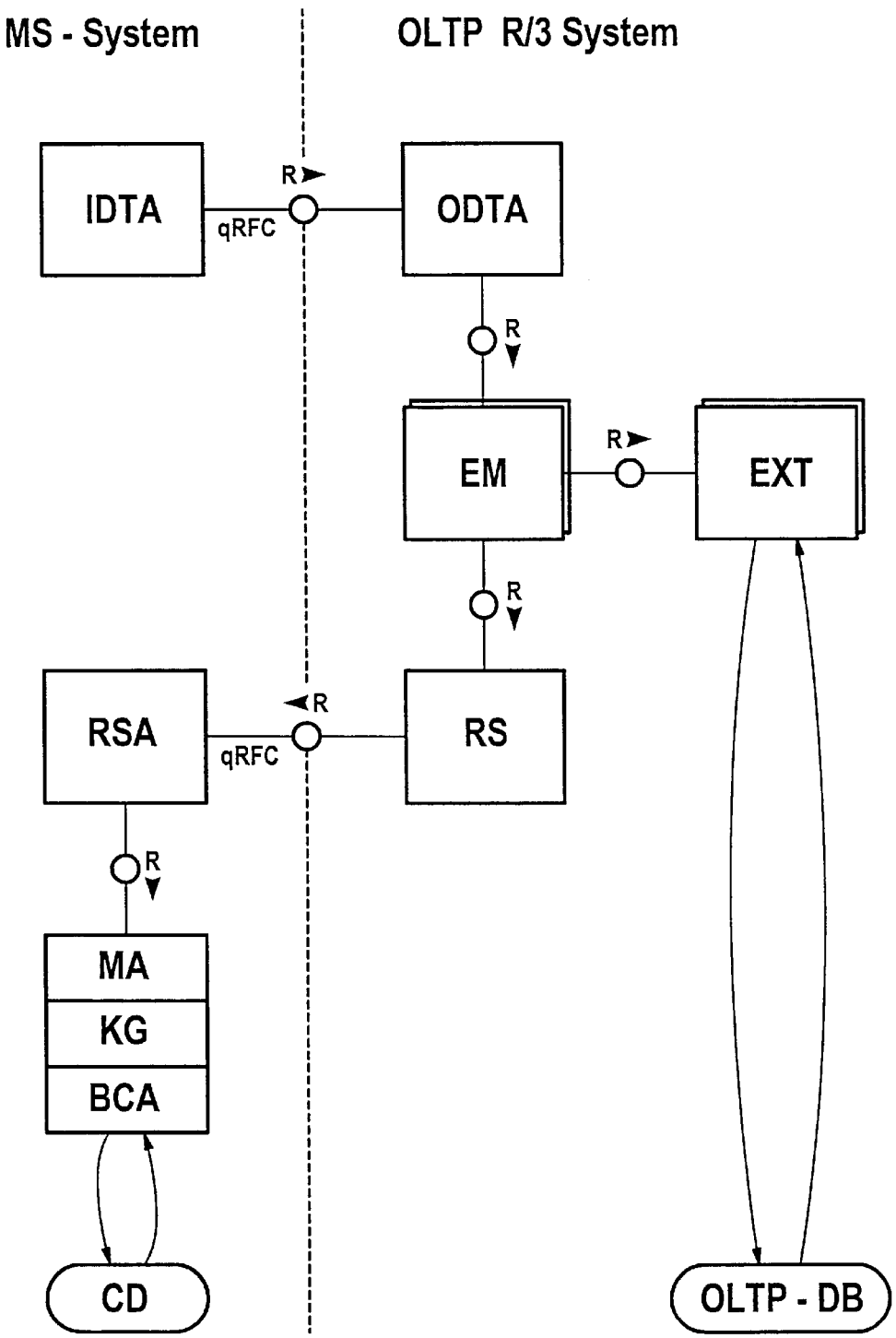
Figure 8:
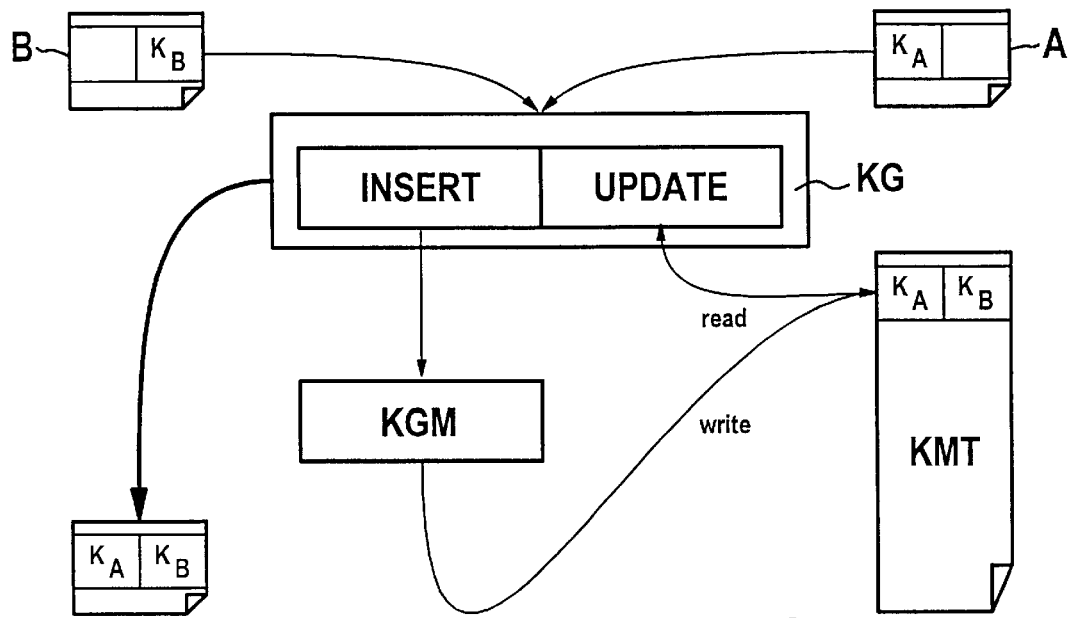
Figure 9:
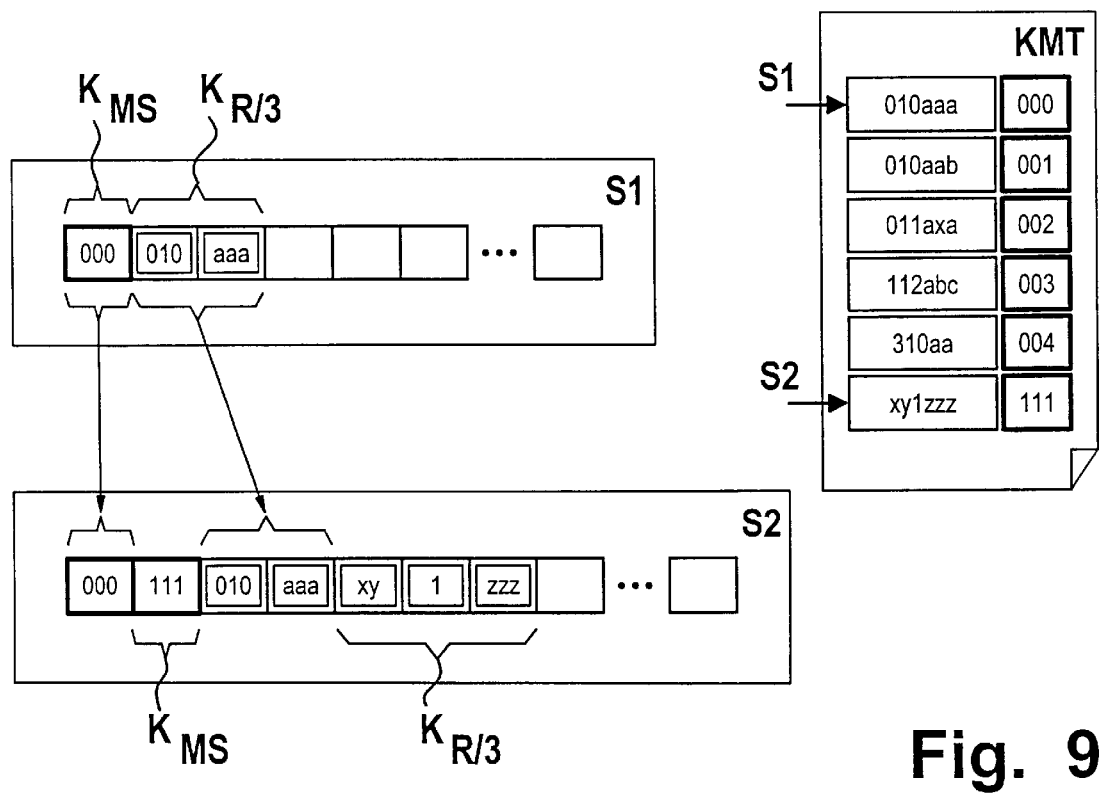
Figure 10:
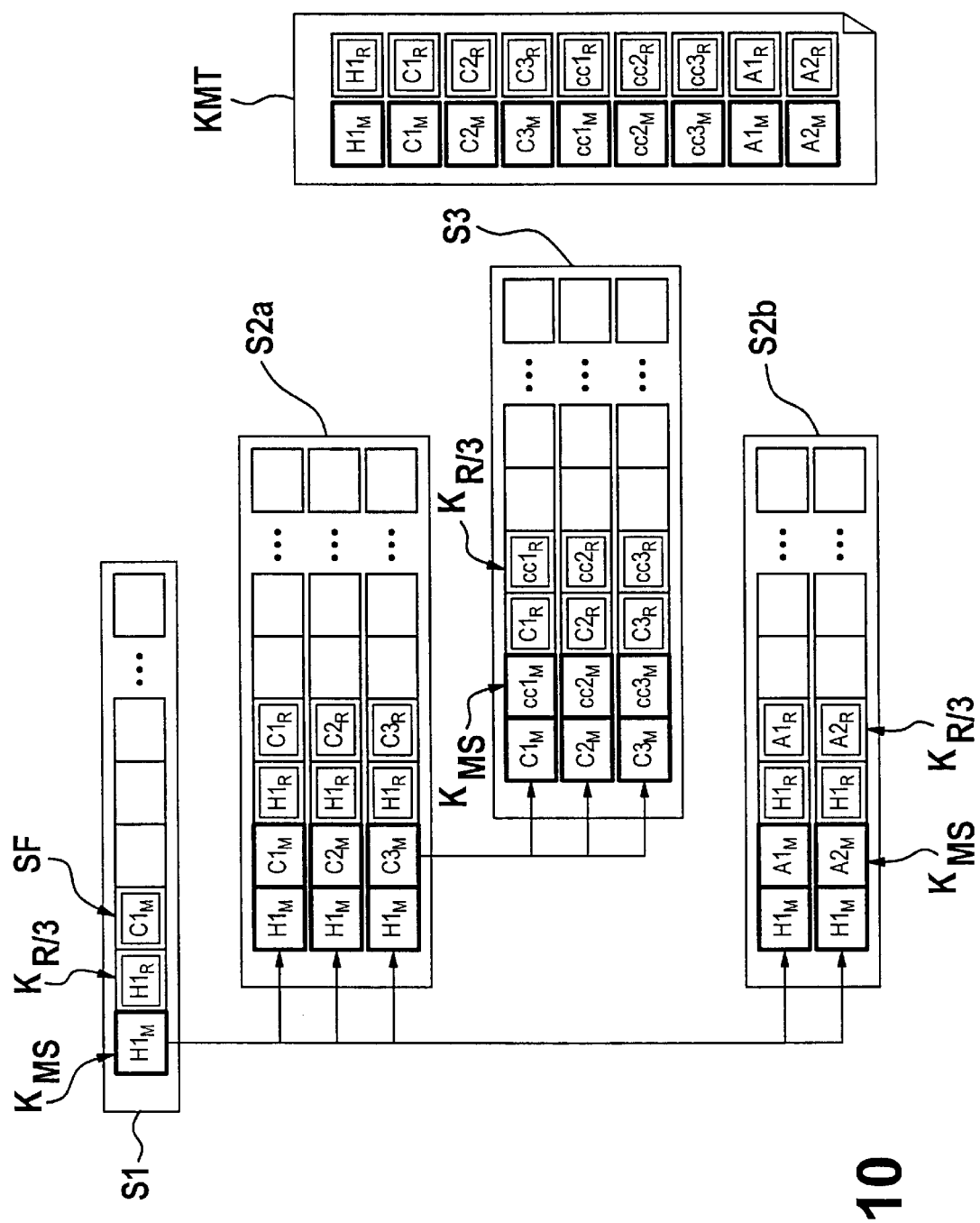
Figure 11:
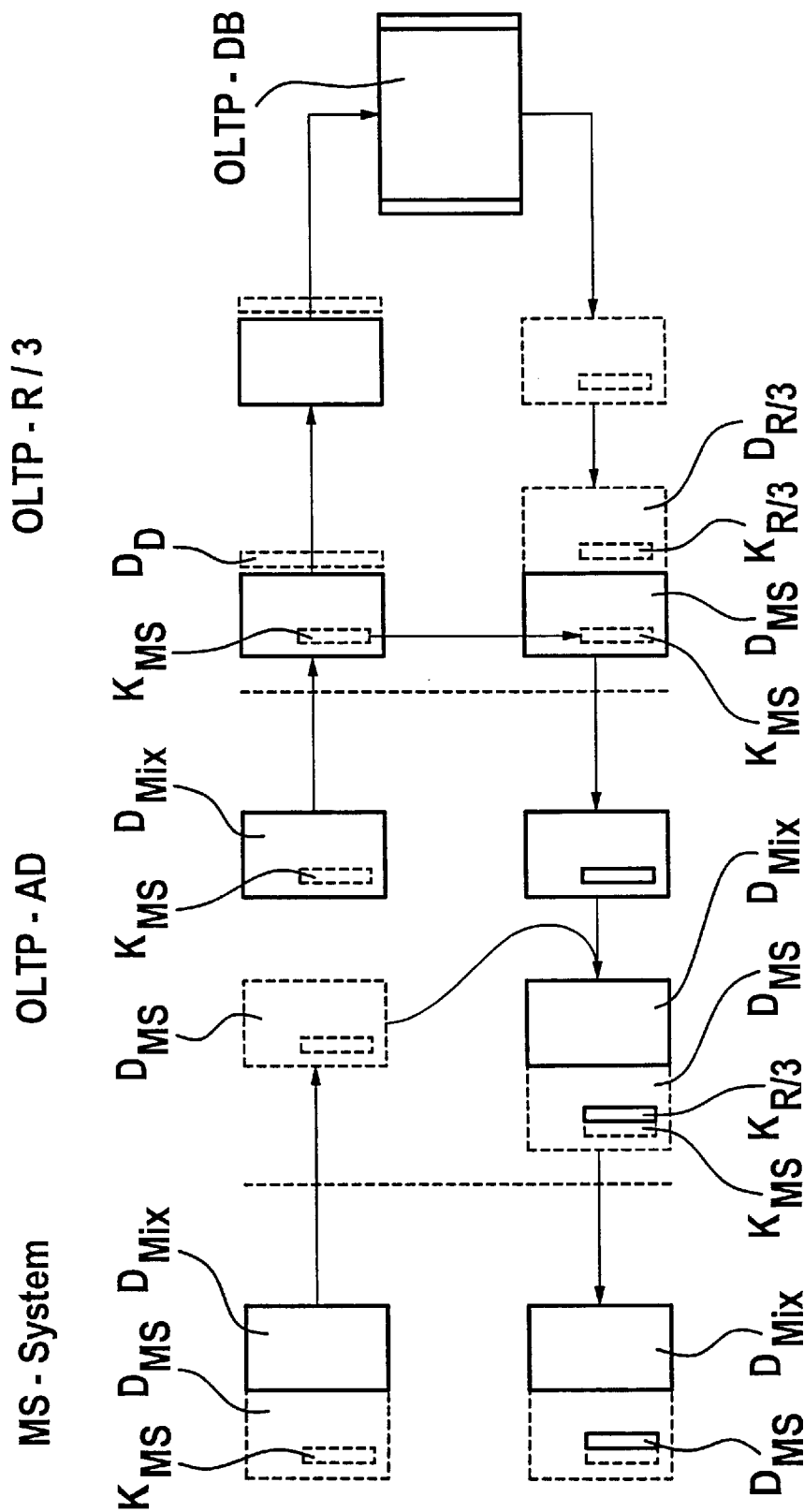
Figure 12:
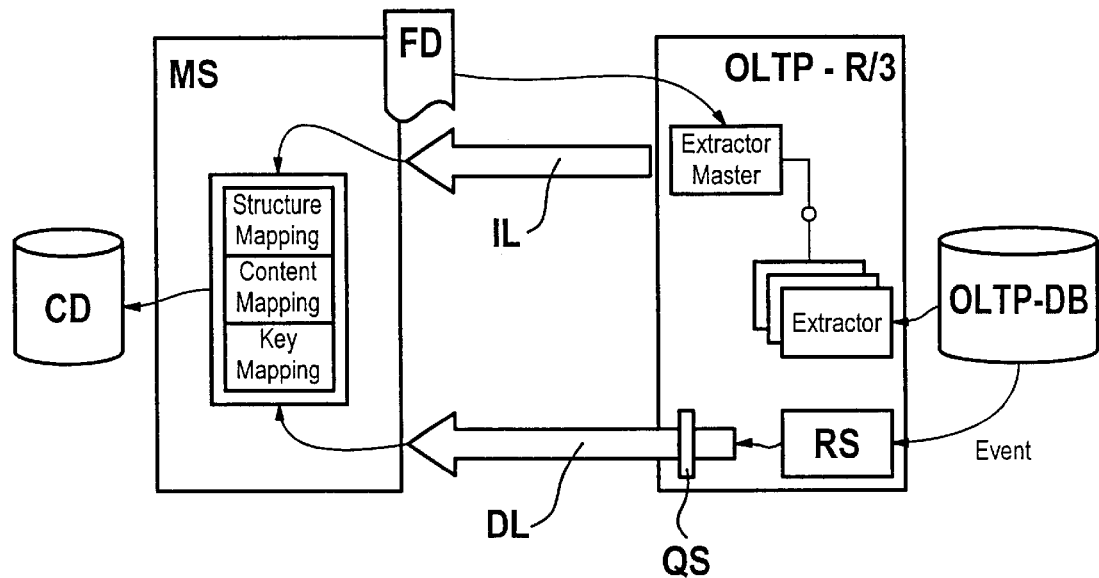
Figure 15:
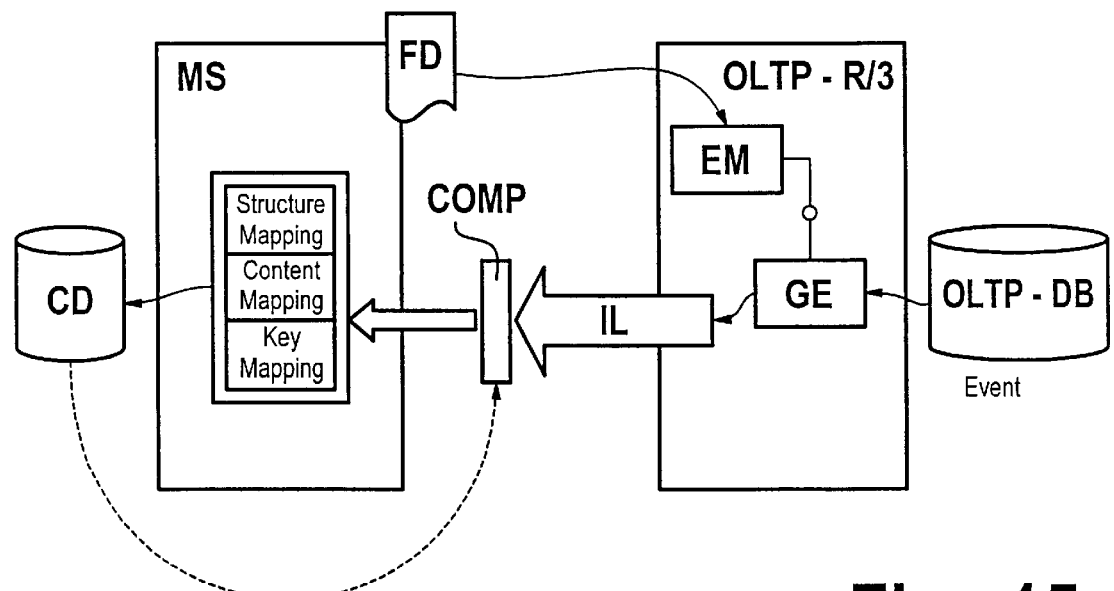
Figure 13:
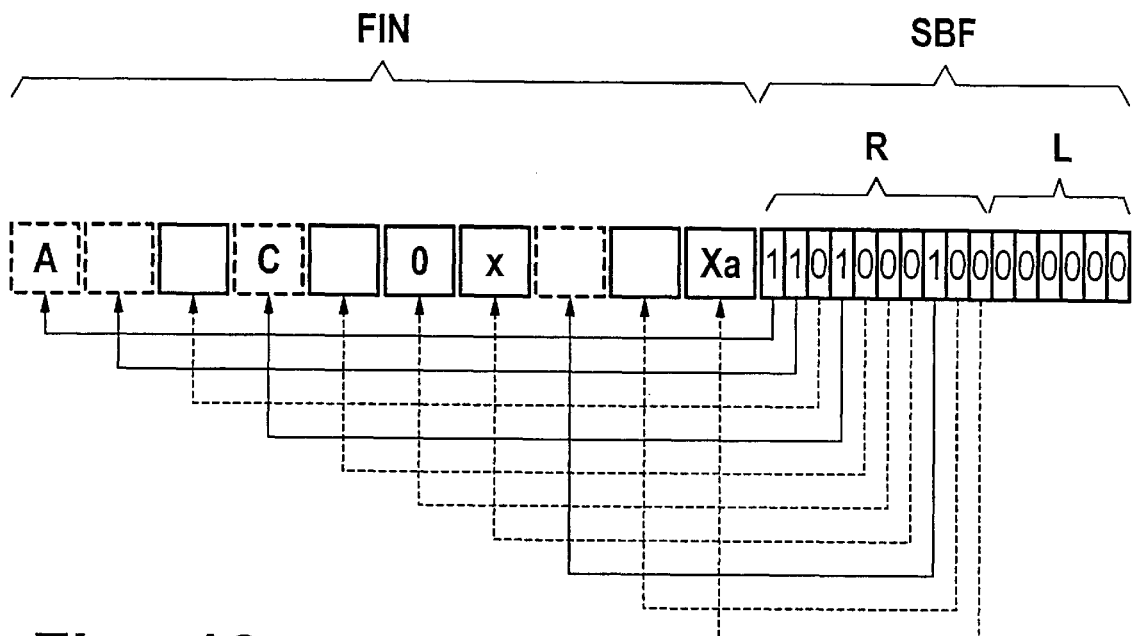
Figure 14:
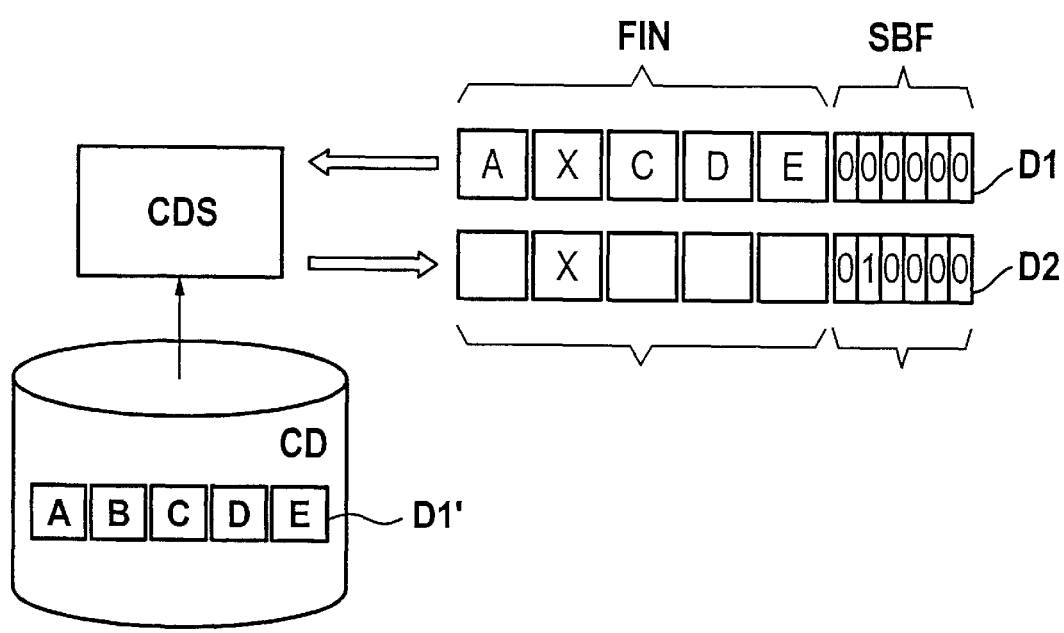
Figure 16:
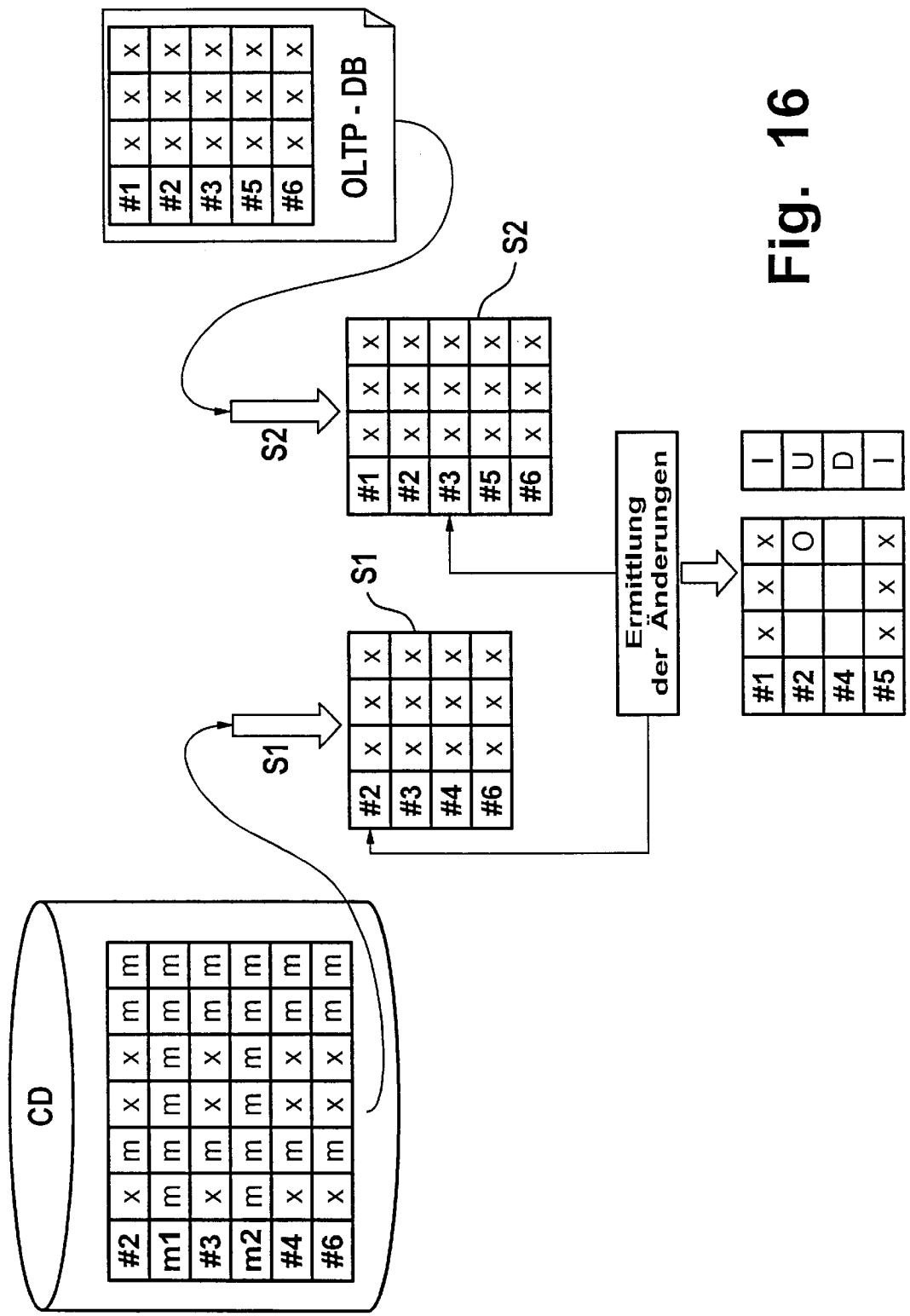
Figure 17:
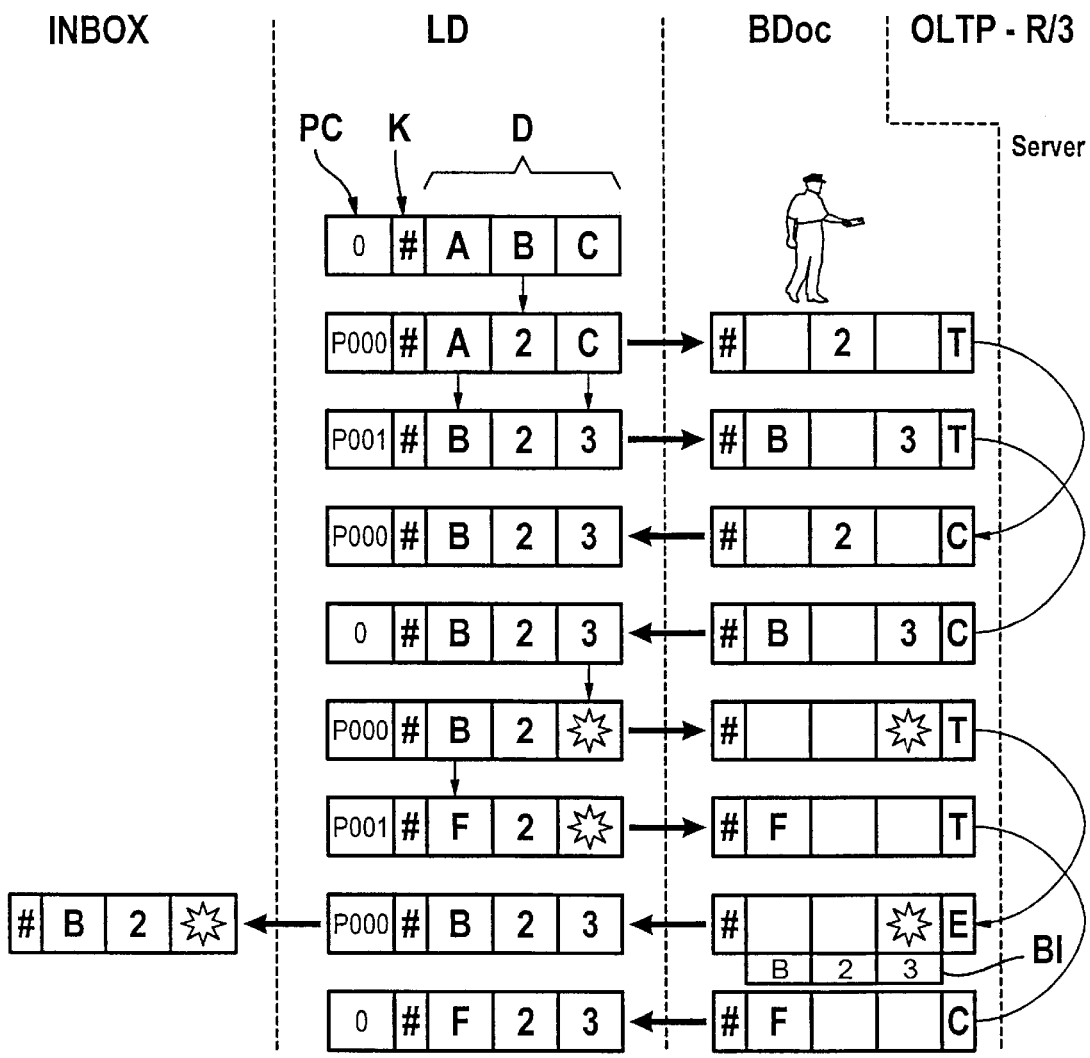

The invention is explained in more detail below with the aid of exemplary embodiments illustrated in the figures. The special features described therein may be used individually or in combination with one another in order to provide preferred embodiments of the invention. In the figures:

FIG. 1 shows an overview of the environment of an inventive composite system of offline-distributed data bases, FIG. 2 shows an overview of the architecture of a front-office system used within the context of the invention, using the example of a CRM system, FIG. 3 shows a typical procedure in the flow control of the system shown in FIG. 2, using the example of a data-upload event, FIG. 4 shows the structure of data objects ("BDocs") used in the system shown in FIG. 2, FIG. 5 shows the architecture of the components which are effective in two systems, linked to one another in accordance with the invention, during the upload and delta download of data, FIG. 6 shows a flowchart in line with FIG. 3 for the case of a delta download, FIG. 7 shows the architecture of the components used for initially downloading data to one of the data base systems involved, said data being contained in the other data base system, FIG. 8 shows a basic illustration to explain a procedure for providing the necessary primary keys across the system, FIG. 9 shows an example of the segment structure of a BDoc and of the associated key mapping table, FIG. 10 shows an example of the structure of a BDoc based on FIG. 9 with a somewhat more complicated segment structure, FIG. 11 shows an illustration to explain the principles of a data-merge procedure suitable for the invention, FIG. 12 shows a basic illustration of the interaction of the most significant components during initial download, FIG. 13 and FIG. 14 show two illustrations to explain a net-field-transmission procedure suitable for the invention, FIG. 15 shows a basic illustration of the fundamental components for explaining a data-synchronization procedure, FIG. 16 shows a basic illustration to explain the operation of a "Compare" module suitable for the invention, FIG. 17 shows a basic illustration of a procedure, suitable for the invention, for resolving conflicts upon data update.

The application illustrated by way of example in the figures, involving an inventive integrated composite system, relates to the integration of a sales and distribution EDP solution (Sales Force Automation; SFA) with a central ERP system. FIG. 1 provides an overview of the environment of such a system.

Employed in the field FD are sales representatives SR who advise the customers C and take their orders, for example. Each sales representative SR has a portable computer, which is also called a mobile client MC and has an associated local data base LD. The portable computers form nodes in a network which are not continuously linked thereto and are therefore called offline nodes.

By way of example, the mobile clients MC provide marketing information and store, amongst other things, the master data for customers and products. The sales representative SR can enter order information, for example, and is informed of the status of open and finished orders. In order to be able to perform these functions autonomously on a temporary basis, all the data required for this purpose are stored in the local data base LD.

The head office HO of the company contains a back-office system which preferably permits online transaction processing. In the illustrative case shown, it is an OLTP-R/3 system. It is denoted by this term in the drawings and in the text below without any limitation of the general nature. It contains a data base OLTP-DB. Its master data are maintained by in-house employees IHE.

A local area network LAN connects the OLTP-R/3 system to a front-office server which is called (MS middleware server), likewise without limiting the general nature. This system also has a data base (consolidated data base) CD.

Besides the mobile clients MC, other systems can optionally be linked to the MS system. The figure shows an external system BW located in the head office HO, said external system supporting the analysis of significant sales information for the company, for example as a "Business Information Warehouse". It has a data base BW-DB. In the case illustrated, it receives data both from the back-office server OLTP-R/3 and from the MS system. In the field FD, customer systems CS, for example, which form additional nodes in the network, can be linked to the MS system continuously (online) or temporarily (offline). In this manner, by way of example, direct orders from the customers can be processed without the involvement of a sales representative SR. The customer system CS also has a data base CS-DB.

The network shown thus contains different data sources (mobile clients MC, OLTP-R/3 system, optional external systems BW and customer systems CS), but these are not independent of one another. They are linked by the MS system, which ensures that each subscriber receives the information which he needs and for which he is authorized. In the case shown, the middleware server MS simultaneously performs this linking function and forms the central computer in a CRM system, which comprises said central computer and the mobile clients and is an offline-distributed data base system. This system is fused with the central data base system OLTP-R/3. The principles of the present invention can also be applied to other cases of data base systems being combined, however, that is to say, in particular, to the combination of two or more central data base systems or to the combination of two or more distributed data base systems.

The data base MS-DB of the MS system contains all the information required for its special function (in the illustrative case, customer relationship management CRM). It is also called a consolidated data base CD, because it contains the content of all the local data bases LD of the portable computers (at the instant of the last data interchange). This means that it is possible to supply the local data bases LD with the necessary data in order, in particular, to transfer data changes or, if necessary, to restore the local data bases LD as well.

The portable computers are connected to the MS system at intervals, for example in the evening of each day, e.g., by means of telephone lines, the Internet or an Intranet. During this time, the data collected since the last connection is transmitted to the MS system. In addition, the portable computer takes this opportunity to receive its own processed data for the respective previous period of time and newly entered data from other portable computers and other systems (as required).

The user data of the interlinked systems is called business data (because it relates to business transactions such as customers, orders and the like in the illustrative case). The OLTP-R/3 system uses this data to form business objects ("BDocs"), which are used as data containers for further processing. By way of example, a business object contains, for a particular order, all the data associated with the order and stored in the data base OLTP-DB, irrespective of what form their logical structure takes (in tables in a relational data base). This structure is known to the OLTP-R/3 system and is similarly also used in other back-office systems.

The control data required for processing the business data in the systems involved are stored in a logically separate part of the respective data bases, which is called a repository.

In terms of transmission to the OLTP-R/3 system, the transmission criteria are largely static. They are stipulated once and remain unchanged unless changes in the business procedures in the respective company require a change at relatively long intervals of time.

By contrast, the data transmission to the portable computers is highly dynamic. For example, the responsibilities of the sales representatives for particular sales areas may change on a frequent basis. Such changes produce a respective change in the criteria for the data transmission, because only the minimum necessary data needs to be transmitted to the portable computers in each case. For the same reason, data which has become obsolete needs to be deleted in the portable computers, while data which has recently become relevant needs to be added. The data transmission criteria are preferably stored in the MS system as 'publications and subscriptions'. The process of updating the transmission criteria and the data for the mobile clients MC is called realignment below.

Since particular data are significant for more than one portable computer, they need to be copied when transmitted to the portable computers. This transmission to more than one receiver is hereinafter referred to as replication.

FIG. 2 provides an overview of the architecture of the MS system. The mobile clients MC are shown on the left-hand side, and the OLTP-R/3 system and the external system BW are shown at the bottom. The rest of the figure shows the MS system, including its data base CD and an associated message transfer server MTS.

The MS system is preferably implemented on the basis of R/3 technology. Accordingly, its functions can be distributed over a plurality of machines; in particular, a separate machine may be used for the data base, and one or more machines may be used for processing requests. The machine on which the message transfer server is running is called the admin station AS as a whole. The message transfer server MTS and the associated admin console AC are preferably installed on a machine running under Windows NT. The resultant possible machine boundary is shown by a dashed line in the figure.

The data in the front-office system are transported using data containers called BDocs. These are also used for communication between the mobile clients MC and the MS system. In this context, a distinction can be drawn between various types of BDocs:

Transactional BDocs are used for transmitting transaction results and status information between the portable computers MC and the front-office server CRM-MS. They can be distinguished further as follows:

Transaction BDocs transport transaction results from the mobile clients MC to the MS system. In this case, the mobile client forms a BDoc containing the result of the transaction and sends it to the MS system.

Confirmation BDocs indicate successful processing of a transaction BDoc by the MS system. If the processing of a transaction BDoc has been successful, the status of the BDoc is changed accordingly and the BDoc is sent back as confirmation message to the mobile client from which it was sent. This confirmation message also contains additional data, which have been made available by the OLTP-R/3 system, for example, or changed values of the consolidated data base CD. In this context, the confirmation BDoc contains either only the changed values or all the values.

Import BDocs transport transaction results for another mobile client MC or an external system from the MS system to the mobile client MC. The import BDocs also contain only changed values or all values. Import BDocs are also used for transmitting data changes originating from sources other than the mobile clients MC from the MS system to the mobile clients.

Error BDocs indicate that an error has occurred in the MS system during processing of a transaction BDoc. In this case, an error segment is inserted into the BDoc, and it is sent back as error BDoc to the transmitting mobile client MC. The error segment can contain different records in order to indicate various error conditions. The error BDoc also contains the original values as "images of the previous state" (before images). All fields are filled with the current content of the consolidated data base CD.

Service-oriented BDocs are used for transmitting binary data from the MS system to the portable computer MC.

Bulk-oriented BDocs are used for transporting large quantities of data from the MS system to the mobile client MC, e.g. during initial download.

In addition, the transported contents of the BDocs can be distinguished by different BDoc types. By way of example, BDoc types can be "customer", "order", etc.

The BDocs and, in particular, their structure are explained in more detail further below.

The data processing in the MS system is performed by means of function modules called a "service" or an "adapter". A service provides a particular function which can be applied to a BDoc. An adapter is a specific type of service which additionally permits connection to a system outside the MS system.

The mobile clients communicate both with the middleware server MS and with their local data base LD exclusively via a transaction layer TL. Further details relating to data interchange between the middleware server MS and the mobile clients as an example of part-replicated data base network systems can be found in the international patent application PCT/DE00/01552, whose content is made the subject-matter of the present application by way of reference.

The functions of the components of the MS system which are shown in FIG. 2 can be characterized in the manner below.

The message transfer server MTS receives BDocs from the mobile clients MC and transfers BDocs to these mobile clients. Data transmission is in each case initiated by a mobile client MC. By way of example, the communication technology DCOM from Microsoft can be used for this purpose.

BDocs are transmitted from the mobile clients MC to the MS system using an inbound message adapter IMA, while messages transmitted in the opposite direction are transmitted using an outbound message adapter OMA. These data transfers take place using a protocol called qRFC (queued Remote Function Call). This is a remote function call protocol in which queues are used for stipulating the order of processing.

The central component of the MS system is the flow control FC. The flow control FC prompts processing of the BDocs by routing inbound BDocs in the correct order to the services and adapters and, if necessary, triggering an error handling procedure. This takes place for all services and adapters via the same interface. The main parameter in the interface is in turn a BDoc. The flow is defined on the basis of specific BDoc type in a control data memory (repository).

External systems such as the OLTP-R/3 system and the BW system are respectively connected to the MS system by means of a specific adapter OLTP-AD or BW-AD. Each external system thus has its own adapter type, which is likewise defined on the basis of specific BDoc in the repository. The protocol and the data structure of the transmission channel between an adapter and the external system connected thereto are specific to the type of external system.

A data base service (consolidated data base service) CDS is used for storing appropriate data in the consolidated data base CD. The service CDS carries out no checks for data consistency when it is writing data into the data base CD. Such checks need to be carried out by the components which transmit data to the MS system (by way of example, the mobile clients MC or the OLTP-R/3 system). For reading the data base CD, the other services do not use the service CDS, but instead use an extract handler (not shown in the figure) which is called by services, adapters or other handlers.

The replication and realignment module RRM has two main tasks. The replication part receives processed BDocs and determines the receivers thereof. For the purposes of faster processing, the information required for this is read from lookup tables. If the replication part establishes that the lookup information needs to be changed on account of a BDoc which is currently being processed, it triggers the realignment handler. The realignment handler creates the necessary lookup information by evaluating the replication rules. In addition, the realignment handler provides new data for receivers and gives instructions for deleting data which are not needed. For this purpose, it uses the extract handler.

The administration console AC is used for customizing the MS server and for administering the entire system in terms of the logical flow of data.

FIG. 3 uses the example of a data upload operation to show a typical procedure in the flow control of the MS system. The column headed MP-FC in the figure shows the steps carried out by the message processor MP in the flow control FC. The first and third columns show the processing steps carried out by services. The last column indicates processing steps which are carried out by the OLTP-R/3 system.

The flow begins when the message transfer server MTS calls the inbound message adapter IMA (using RFC) because a new BDoc has been received. The inbound message adapter IMA starts the message processor MP-FC.

The flow which is to be executed is determined by the message processor MP. In principle, a distinction can be drawn between two flow procedures, one for processing BDoc types which are at least to some extent relevant to the OLTP-R/3 system, and one for other BDocs (circulating only within the MS system).

On the basis of the flow definition stored in a repository for the respective BDoc types, the message processor MP determines the first service or adapter which is called. For types of BDocs which are (at least to some extent) relevant to the OLTP-R/3 system, the first service called is the OLTP-R/3 adapter OLTP-AD.

For other BDocs, the OLTP-R/3 adapter is not called. The decision of whether the OLTP-R/3 adapter is to be called for a type of BDoc has been made during definition of the flow, that is to say, is not made while the flow is occuring.

When the OLTP-R/3 adapter OLTP-AD has been called, it determines whether the BDoc is actually relevant to the OLTP-R/3 system. This is not necessarily the case, because relevance to the OLTP-R/3 system does not depend only on the type of BDoc, but may also depend on its content. One example are BDocs of the business object type "customer". If such BDocs contain information relating to customers, they are sent to the OLTP-R/3 system. If they contain information relating to sales and distribution contacts, however, they are stored in the MS system only.

When the OLTP-R/3 adapter has established that a BDoc is relevant to the OLTP-R/3 system, it sends a call thereto and interrupts the flow in progress. Once the processing in the OLTP-R/3 system has been stopped, the OLTP-R/3 system sends a call to the OLTP-R/3 adapter, which receives the result and restarts the flow by calling the message processor MP in the flow control FC.

The message processor MP-FC ascertains which service needs to be called next. If the OLTP-R/3 adapter OLTP-AD has established that the BDoc is not relevant to the OLTP-R/3 system, it returns control to the message processor MP-FC, which also determines the next service which needs to be called in this case.

Normally, the data base service CDS is called after the OLTP-R/3 adapter. The data base service preserves the data contained in the BDoc in the consolidated data base CD.

When the data has been successfully written to the consolidated data base CD, the replication and realignment service RRM is usually called. A function of this service is to check whether the BDoc influences the replication information. If this is the case, an order is created for the realignment handler to update the lookup information and to create a BDoc for distributing the business data. The second action of the replication and realignment service RRM is to add a receiver list to the current BDoc.

Finally, the outbound message adapter OMA is called to prepare the BDocs for transfer to their receivers by means of the message transfer service MTS.

If the upload fails, a reject service RS is called. The BDoc is marked as an error BDoc (that is to say as a BDoc which contains error information). During the update operation, the reject service reads the valid values from the consolidated data base CD. During all operations, the respective previous states of the mobile clients MC are marked. The BDoc is then sent back to the portable computer from which it was transmitted. There, the appropriate transaction is executed again.

FIG. 3 shows—with the exception of the reject service RS—only the success path. Naturally, an error processing routine is also provided, although not described in more detail here.

In FIG. 4, the structure of the Bdocs is explained in more detail. The top part of the figure shows the structure of the BDoc type's definition, which is stored in the repository of the MS system. The structure, which is likewise stored in the repository, of the BDoc itself is shown in the bottom part.

The BDoc comprises the BDoc header BDoc-H and the BDoc body BDoc-B. The BDoc header BDoc-H contains control information, such as the type ("customer", "order", . . . ) of the BDoc, the sender thereof (mobile clients MC) and a time stamp. For performance reasons, it is advantageous if it also contains a duplicate of the primary key.

The data are contained in the BDoc body BDoc-B. A data record DR contains the actual data. The structure is defined in the definition of the associated data segment DS. The segments form a type of tabular view for the actual physical tables. Optionally, the BDoc also contains an error segment ES having one or more error records ER.

The data areas have a stipulated length. They comprise a key and data fields. If they contain a deletion information item, only the key field contains valid data. If they contain "insert" or "update" information, either all the fields contain valid data or unmodified fields contain a preset value (for example 0.0). To indicate whether a field is filled or unused, "send bits" are used. Primary keys and fields which need to be taken into account for replication and realignment are always sent (irrespective of whether they have been changed). Send bits are set only if the value has actually been changed.

The definition of the BDoc type, that is to say the information item relating to the structure comprising hierarchically arranged elements which is specific to the respective BDoc type, is contained in the BDoc type definition, which comprises a BDoc body definition BDoc-BD and BDoc segment definitions BDoc-SD. The BDoc body definition BDoc-BD contains precisely one root segment containing only a single data record. This condition needs to be observed in order to ensure that the information contained in the BDoc can be individually transferred to the respective node systems or can be processed in another manner. By way of example, a BDoc of the "customer" type can store only information relating to a single customer so that the customer information item can be supplied to the appropriate node systems individually and specifically for each individual customer. The data records of segments arranged afterwards contain dependent data, for example relating to the customer's machine equipment. In this case, it is naturally possible for a plurality of records to be available for one segment.

Whereas the segments in the definition of the BDoc type are hierarchically structured, there is no such hierarchy for the physical reproduction of the BDocs. The hierarchical dependency is contained in the BDocs by virtue of the data records DR of dependent segments containing the key for their superordinate data records. In the case of transactional BDocs, an independent segment is also (apart from the optional error segment ES with error record ER) provided, which is called a root segment.

When changed data are transferred to the MS system, the values which the mobile client MC had before the change may be of interest to the MS system. Such "images of the preceding state" (before images) are transferred to dedicated data areas which are appropriately flagged.

Service-oriented BDocs are used to transfer data of the external system BW and installation files to a mobile client MC. The body of a service-oriented BDoc comprises a root segment, having general information, and a memo segment, which contains the binary data.

Bulk-oriented BDocs are used for the initial setup of a mobile client (initial client setup) and for data transport during realignment. Bulk-oriented BDocs are also defined on the basis of specific type (that is to say for the "customer" object type, for example). However, they are not subject to the restriction that their root segment can contain only one record. By way of example, a bulk-oriented BDoc can thus transmit the data for a multiplicity of customers at once.

The OLTP-R/3 adapter OLTP-AD links the OLTP-R/3 system to the MS system. It is used to transport data in both directions. When data, for example the order from a customer, are input into the mobile client MC and are then forwarded to the OLTP-R/3 system, this is called an "upload". When data are input into the OLTP-R/3 system and are forwarded from there to the MS system, this is called a download.

There are three distinguishable types of downloads. An initial download is used to fill the MS system's consolidated data base CD with data from the OLTP-R/3 system at the start of operation. A delta download takes place when online users input data into the OLTP-R/3 system and the changed object is forwarded to the MS system. Such a delta download is not possible for all data types. If this function is not available, a third download mechanism is used, which is called synchronization mechanism below.

The MS system's and the OLTP-R/3 system's components which are effective for the upload and for the delta download are shown in FIG. 5. Component parts of the MS system are the flow control FC for coordinating the process steps required for processing the BDocs, the OLTP-R/3 adapter OLTP-AD, and also three agents called key generator KG, mapping agent MA and merging agent MEA. These agents perform auxiliary functions for the OLTP-R/3 adapter.

One component part of the MS system is a calling frame CF for calling standard BAPIs (business application programming interface) SB, which can be called during processing of the BDocs. The standard BAPIs call update function modules UFM in order to preserve changes. These update function modules UFM are also called by dialogue programs DP.

For each change, the update function modules UFM create an event, which is transferred to the event distributor ED. In response to such a transfer, the event distributor starts all the subscribers. Amongst other things, this calls the results sender RS, entered as a subscriber. The modified data are transferred to the MS system by the results sender RS. A memory area Key References KR stores keys $K_{MS}$ of the front-office system MS and object references OR. A memory area Additional MS Data AMD contains data which must be transported by the OLTP-R/3 system, but is itself not relevant to this system (for example keys of the front-office system). The MS system transfers no data to the OLTP-R/3 system which is not relevant thereto.

The calling frame CF and the results sender RS are the only component parts of the OLTP-R/3 system which have been implemented additionally for the functions described here.

An upload is effected as follows. In the MS system, a BDoc is processed. As a step in this processing, the OLTP adapter OLTP-AD is called. The OLTP adapter decides whether the BDoc is relevant to the OLTP-R/3 system. If it is relevant, the BAPI caller BC flags the BDoc accordingly. This ensures that other BDocs in the same queue are not processed as well. Those BDocs which are not relevant to the OLTP-R/3 system also need to be in the queue, because there may be a dependency between a BDoc in the queue and preceding BDocs. The structure of the BDoc is mapped onto the parameter structures of the appropriate BAPI of the OLTP-R/3 system. The calling frame of this BAPI is then called in the OLTP-R/3 system.

A first task of the calling frame is to prevent double processing. If a new object is to be created on the basis of the BAPI, the calling frame checks whether the object already exists and has been created upon an appropriate request from the MS system. If this is the case, instead of a business object being newly created, the data already processed is extracted and transferred back to the MS system. A second task of the calling frame is to ensure the necessary mapping between the keys and object references of the MS system and the keys and object references of the OLTP-R/3 system. A third task is the handling of the commit cycles. This ensures that the BAPI processing proceeds in a single commit cycle. As a result, the data is stored in the back-office system OLTP-R/3 and are transferred to the front-office system MS in a joint processing step.

The main function of the calling frame CF is to call the standard BAPI SB. For this purpose, the calling frame contains all the information which is required in order to convert the structure of a BDoc received by it into the structure of the universal interface BAPI. The BAPI processes the data of the BDoc and contains calls to update function modules UFM. These function modules begin their work when the calling frame sends a commit command to the standard BAPI. The update function modules preserve the data changes on the data base. In addition, they create an event which is distributed to the subscribers of the event distributor ED. One of these subscribers is the results sender RS. The results sender receives the changed data as parameters of the created event, mixes them with the additional MS data AMD and transfers them to the MS system.

In the MS system, a result save agent RSA maps the received results back into BDoc structures. The merging agent MEA mixes the results coming from the OLTP-R/3 system with the BDocs in the MS system. The result save agent RSA then starts the flow control for the BDocs by changing the status of the BDocs to "OLTP Complete".

For the flow control for processing the BDocs, by way of addition, reference is made to the explanations above with reference to FIG. 3.

The process of a delta download (transfer of data which has been input directly into the OLTP-R/3 system and is then transferred to the MS system) is very similar to that of the upload. FIG. 6 shows the full flow control during processing of a BDoc which has been created as a result of a delta download. The architecture is equivalent to FIG. 5.

The in-house employee IHE communicating with the OLTP-R/3 system online using the dialogue program DP creates a business object. The dialogue program DP calls the update function modules UFM and begins its work. The update modules create the events, and the results sender RS calls the result save agent in the MS system. By contrast with the upload process, no additional MS data is available which the results sender RS would need to transfer to the MS system. Missing MS data, such as MS keys for newly created objects, is created by the key generator KG, which, for its part, is triggered by the result save agent RSA. For the data received from the OLTP-R/3 system, a new BDoc is created, and the flow control is started in order to process the appropriate control flow, as shown in FIG. 6.

In order to fill the data base CD of the MS system before the start of productive operation, an initial download is necessary. The business object classes which are to be downloaded are determined during customization of the system. In addition, instances of business objects can be filtered on the basis of particular attribute values. Finally, it is possible to use specific exits (customer exits).

FIG. 7 shows the architecture of the components used for the initial download. An initial download trigger agent IDTA is started by the system administrator before the production phase begins, in order to initiate initial download. The initial download trigger agent calls an OLTP download trigger agent ODTA. Triggering is effected by means of qRFC. This ensures that the initial download action is carried out precisely once. The OLTP download trigger agent ODTA calls extractor masters EM for selected classes of business objects, said extractor masters calling, for their part, R/3 extractors EXT. The difference between an extractor master EM and an extractor EXT is that the extractor master is a component which is specifically suited to cooperation with the MS system, whereas the extractors EXT are also used in other contexts in the OLTP-R/3 system.

On the basis of the filter criteria received from the extractor masters, the extractors EXT select object data from the OLTP data base OLTP-DB. In addition, the extractor master also supplies information relating to tables which are to be processed, so that complete objects do not necessarily need to be extracted. The respective extractor master transfers the selected objects to the results sender RS. As mentioned, specific exits can be used to carry out additional filtering in the results sender.

The results sender RS transfers the business object data to the BAPI result save agent RSA. The BAPI result save agent calls the agents for the mapping MA, for the key generation KG and a bulk storage agent for the consolidated data base (bulk CDB agent) BCA. The mapping agent converts the structures of the OLTP-R/3 system into structures of the MS system. The key generator creates MS keys for those objects which have only an OLTP-R/3 key. The bulk storage agent BCA writes the data of the business objects to the consolidated data base DB. The difference between the bulk storage agent BCA and the data base service CDS of the MS system is that the former is able to process a plurality of objects at the same time, whereas the latter is able to process only data of an individual business object in each case.

To ensure good performance, a plurality of classes of business objects are downloaded at the same time. However, this is done only for mutually independent classes of objects. If objects depend on other objects (for example "orders" on "customers"), they are downloaded successively in an appropriate order. In this context, the objects are not downloaded at the level of instances, but rather at the level of classes, in order to be placed in the desired order.

The extractors extract the data from the OLTP-R/3 data base. As mentioned, they are also used for other application areas (for example an external application BW).

The use of the extractors comprises two steps. In the first step, filter criteria are transferred to an extractor. This extractor determines the keys for all business objects which correspond to the filter criteria. In a second step, the extractor master EM is called using the key list, in order to read the actual information. The extractor master uses the extractors to fetch the data specified in the call from the tables in the order required for further processing as a BDoc.

A block size determines the number of business objects which are processed in one pass. The extractor can work serially, that is to say is able to process one pass after another. A parallel mode of operation is also possible on an object-by-object basis.

The structures of the OLTP-R/3 system are converted into structures of the MS system by mapping. The mapping is carried out on a field-by-field basis. In this context, a plurality of fields can be concatenated to form one field, or a field can be subdivided into a plurality of parts. The field types are converted. In addition, dependent information is created from the source fields.

The key generator KG is used to find respective CRM-MS keys for the OLTP-R/3 keys. In this case, a respective key generator is generated specifically for a type of BDocs using repository information. To keep the key generator agent up-to-date, a generator for creating key generators is registered with the generator agent of the repository as a subscriber. It is called when the appropriate information of the repository changes.

The key generator receives a BDoc and provides CRM-MS keys, in this case in the form of GUIDs (globally unique identifiers), for all available OLTP-R/3 keys. The necessary MS keys are sought at various locations, namely first of all in a local table of the key generator, then using a key mapping table, and finally in the consolidated data base CD. If no MS key is found, a new one is created and is inserted into the various mapping tables.

The additional key mapping table is necessary in order to prevent a key from being created twice in the cases in which the data have not yet been stored in the consolidated data base CD. The local table of the key generator is optional and serves merely to improve the performance in the form of a cache.

For the purposes of synchronization between the OLTP-R/3 data base OLTP-DB and the consolidated data base CD of the MS system, two components are provided: "Request" and "Compare". The Request component is very similar to the component for the initial download. It allows particular business objects to be specifically downloaded from the OLTP-R/3 data base OLTP-DB into the consolidated data base CD, and hence permits the data of the portable computers MC to be replicated (under the control of the flow control FC). The filter criteria specified by a Request are mixed with the general filter criteria of the initial download, so that only one subset of the data processed during the initial download can be selected. The Request component can be started both interactively and in batch mode.

The Compare component downloads business data from the OLTP-R/3 system. The differences resulting from the comparison action describe the changes which need to be made in the consolidated data base CD in order for its content to match the content of the OLTP-R/3 data base OLTP-DB. In this context, the change information ("Insert", "Update", "Delete") is stored in BDoc structures. After the actual comparison action, the changes are applied to the consolidated data base DB in order to make it consistent with the OLTP-DB. The change information is used to create BDocs, and these BDocs are used to replicate the local data bases LD of the mobile clients MC (under the control of the flow control).

A few functions fundamental to the invention are explained below by way of addition.

1. Provision of Primary Keys Across the System

As explained above, it is important for the semantic integration of offline-distributed data base systems that a primary key permitting unique identification of the data objects beyond the boundaries of the data base systems which are fused together be available across the system.

The basic principles of a procedure suitable for this purpose are shown in FIG. 8 (by way of addition to the explanations already given above). The key generator KG receives the data entered in one of the data base systems (source system), which are denoted generally by A or B in this case. These data include the respective system-specific primary key $K_A$ or $K_B$. For the respective other primary key (of the destination system), an empty field is provided in the data record. The key generator reads the content of a key mapping table KMT and compares it with the key fields of the data record supplied by one of the systems A or B. If the primary key of the source system (for example $K_A$) is already available in the key mapping table KMT, the supplied data record relates to a change (Update) to an already existing entry. In this case, the associated primary key of the destination system (for example $K_B$) is read from the key mapping table KMT and is entered into the empty field of the data record.

If, by contrast, the primary key supplied is not found in the key mapping table KMT, then a new data record is being created (Insert). In this case, a key generate module KGM creates the missing primary key (for example $K_B$) and writes it to the key mapping table KMT. In addition, it is entered into the empty data field. The data record can then be uniquely identified in the destination system as well, and the keys of the source system and of the destination system are uniquely associated with one another.

A practical way of implementing this principle in a data base system whose data objects—like the BDocs described above—contain a complicated structure of hierarchically structured data segments in the practical implementation is explained below.

FIG. 9 shows a very simple structure comprising two segments S1 and S2. The segment S1 is one stage above the segment S2 in the hierarchy and is therefore called the father segment for the child segment S2. In the case shown, the father segment is the root segment of the BDoc.

The father segment S1 contains a primary key $K_{MS}$ of the MS system and a primary key $K_{R/3}$ of the OLTP-R/3 system. Each of the keys is stored in one or more fields of the segment.

The child segment also contains a primary key $K_{MS}$ (stored in one field) of the MS system and a key $K_{R/3}$ (stored in three fields) of the OLTP-R/3 system. In addition, the fields of the child segment also contain the keys of the superordinate father segment, as is made clear by the arrows between the two segments. However, these fields have no key function, but instead serve as 'foreign keys' for providing information relating to the segment structure. They thus indicate that S2 is a child of the segment S1.

The right-hand part of FIG. 9 shows an associated key mapping table, with the rows denoted by the arrows indicating the keys of the segments S1 and S2.

FIG. 10 shows a somewhat more complex field structure having a father segment S1 (root segment of the BDoc), two hierarchically subordinate segments S2a and S2b of the child generation, and a segment S3 of the grandchild generation, which is a child of the segment S2a. By way of example, for a BDoc of the "customer" type, the segment S1 could contain the name and address of the customer, the segment S2a could contain the contacts for the customer, the field S3 could contain contact information for the contacts (telephone numbers, business hours, etc.) and the field S2b could contain information relating to machines installed with the customer.

In this case too, each segment contains (in the case shown, in only one respective field for the sake of clarity) the keys $K_{MS}$ and $K_{R/3}$ of the two data base systems, with the dependent systems containing the respective keys of the father generation as foreign keys. In turn, the key mapping table illustrated on the right-hand side of FIG. 10 shows the allocation of the keys of the two systems.

In practice, data objects of large data base systems can have very complicated structures with numerous interleaved hierarchical levels, the segments often containing very large numbers of data records. In addition, specific structural elements are frequently necessary in order to allow for particular requirements. By way of example, there is frequently the need to be able to access data of individual data records quickly even though they are situated on lower hierarchical levels. In these cases, it is expedient to store the required key of a hierarchically lower segment in a specific field of a higher segment. By way of example, FIG. 10 shows that the key having the code $C1_M$ of the first data record of the segment S2a is entered in the special field SF of the segment S1, for example in order to allow direct access to the most important contact of the customer coded in S1. Such structural peculiarities make carrying out the procedure outlined above very difficult in practice.

Such problems can be solved using the algorithm shown below. It comprises two program parts, called PASS-I and PASS-II.

PASS-I:

```
For all (defined) segments {
    For all data records {
        // Fill K_MS //
        If (K_MS = EMPTY) {
            Search in KMT (K_R/3)
            If entry available {
                Remove K_MS from KMT
                Enter K_MS in BDoc
            } otherwise {
                Generate new K_MS
                Enter K_R/3, K_MS in KMT
                Enter K_MS in BDoc
            }
        }
        // Fill MS father key //
        If (MS father key = EMPTY) {
            Position in BDoc father segment (R/3
            father key)
            Remove MS father key from BDoc Father
            Segment
            Enter MS father key in BDoc
        }
    }
}
```

In PASS-I, the algorithm section headed by the comment "Fill $K_{MS}$" is carried out for all defined segments (i.e., for all segments for which key generation is required) and for all data records. This algorithm section first asks whether the field for the primary key is empty. If this is true, the key mapping table is searched under the available key $K_{R/3}$ to determine whether an entry is available. If appropriate, the associated MS primary key is removed from the key mapping table and is entered into the BDoc.

If no entry for the sought KMS is available, a GUID is created as new MS primary key, and both the $K_{R/3}$ and the $K_{MS}$ are entered into the key mapping table. In addition, the $K_{MS}$ is entered in the BDoc.

Next, the algorithm section headed by the comment "Fill MS father key" is carried out. If the field for the MS father key is empty, the reading position is put into the father segment within the BDoc, specifically into the data record which contains the corresponding $K_{R/3}$. The corresponding $K_{MS}$ is then removed from the father segment and is entered into the foreign key field of the child segment.

PASS-I is carried out a number of times until all the segments of the BDoc have been processed in the order prescribed by the hierarchy (starting with the highest hierarchical level).

Next, PASS-II is started. This is controlled by means of a table, called a FETCH table, which is stored in the repository. This table describes filling actions which are not possible in PASS-I. These include filling with values from hierarchically lower segments (as shown in FIG. 10) and filling with keys from a hierarchical level which is higher than the father level (that is to say, for example, two levels higher, i.e. grandfather).

In order to be able to perform these functions, the FETCH table has the following structure:

DestTbl: Destination Table
DestFld: Destination Field
SrcTbl: Source Table
SrcFld: Source Field
Cond: $K_{R/3}$ or condition in accordance with the sample x=y An entry in the FETCH table creates a filling action from the source field of the source table into the segment, denoted as destination table, of a BDoc.

Algorithm representation for PASS-II:

```
For all defined segments {
    For all entries in the FETCH table in which
    DestTbl = segment {
        Read in values from FETCH table
        If (Cond = R/3) {
            // Values within the BDoc
            Position in BDoc on SrcTbl (K_R/3)
            Write SrcTbl -> SrcFld in DestTbl ->
            DestFld
        } otherwise {
            // Values from CD
            Position in CD on SrcTbl with filter =
            Cond
            Write CDSrcTbl -> SrcFld in DestTbl ->
            DestFld
        }
    }
}
```

For all segments of the processed BDoc and for all entries in the FETCH table for which the segment has been entered as DestTbl, the value is read from the FETCH table. Next, case distinction takes place.

If Cond=R/3 has been set, key values are being transmitted within the BDoc, with the content of the source field in the source segment being transmitted into the destination field within the destination segments. If the condition Cond has another value, values are being transferred from the BDoc itself or from the consolidated data base CD, with a source table within the data base CD being accessed and the content thereof being transmitted into the destination field of the destination segment in the latter case.

2. Data Merge

Another fundamental problem when fusing different data base systems is that the data available for a particular type of data objects in the two systems are different. By way of example, a CRM system may contain information relating to individual customer contacts or preparatory sales discussions ("opportunities") for the "customer" data object, which information is not required by an ERP system. Conversely, the "customer" data object in an ERP system contains information such as the full customer account since business relations began, which is not required by the CRM system and for which there are therefore no segments available in the data objects processed therein.

With regard to the primary keys, the logic explained above is advantageous, where one of the systems, namely the front-office system MS, holds both keys $K_{MS}$ and $K_{R/3}$ of the fused systems, while the back-office system holds only its key $K_{R/3}$.

To enable the interchange of data in such an arrangement to be as complete as possible, a "data merge procedure" is preferably used; this procedure is described with reference to FIGS. 5 and 11, using the following convention:

$D_{MS}$: Data which exist only in the MS system
$D_{R/3}$: Data which exist only in the OLTP-R/3 system
$D_{Mix}$: Data which exist in both systems If data, as shown in FIG. 11, from the MS system is provided as a system-specific data object (BDoc) for transfer to the OLTP-R/3 system, it contains $D_{MS}$, $D_{Mix}$ and $K_{MS}$ as keys. In the OLTP adapter OLTP-AD, the data $D_{MS}$ is distributed and parked by the BAPI caller BC. Next, the OLTP adapter transports the rest of the information $D_{Mix}$ and $K_{MS}$ into the OLTP-R/3 system. The key of the source system $K_{MS}$ is removed in the destination system OLTP-R/3 and is parked in the memory area Additional MS-Data AMD.

Next, the $D_{Mix}$ data is complemented with additional data $D_D$ which is necessary in order to process the created data object in the destination system (OLTP-R/3). This additional data is generally preset values (default values) for the corresponding data fields.

Normal processing is then carried out in the OLTP-R/3 system. The data is checked asynchronously using the logging routine customary in the destination system and stored in the data base OLTP-DB.

In connection with the logging, an event is triggered which the event distributor ED transfers, amongst other things, to the results sender RS, which then receives the data from the logging. The data packet received comprises $D_{R/3}$, $D_{Mix}$ and $K_{R/3}$. The results sender RS inserts the parked MS key $K_{MS}$ and removes the data $D_{R/3}$ which is not relevant to the MS system. The data packet is then transferred into the MS system as data packet $D_{Mix}$, $K_{MS}$ and $K_{R/3}$. Within the MS system, the result save agent RSA adds the parked data $D_{MS}$ again, so that the full BDoc containing the data $D_{MS}$, $D_{Mix}$, $K_{MS}$ and $K_{R/3}$ is available for further processing (in particular, for consolidation in the data base CD and for subsequent replication to the mobile clients MC).

This data merge procedure takes place whenever data from the MS system is updated into the OLTP-R/3 system. In the case of data changes in the OLTP-R/3 system (delta download), part of this procedure is executed starting with the logging routine, with no MS key $K_{MS}$ being able to be added, of course. In this case, it is generated by the key generator KG in the manner explained above.

3. Download

A fundamental aim of the combination of data base systems is for jointly used data in the systems not to have to be maintained separately, but instead for the data present in the combined data base systems to be rendered jointly usable. By way of example, a CRM front-office system needs to be able to access data relating to customer and product information stored in the ERP back-office system of the company.

a) Initial Download

Hence, the first object which is set is to transmit those data in an already existing first data base system (source system A, in this case OLTP-R/3 system) which is also required by a newly implemented further data base system (destination system B, in this case MS system) from the system A to the system B within the scope of an initial download. In this context, the problem solutions below are proposed within the scope of the present invention.

The volume of data in the existing back-office system (called OLTP-R/3 system below, still without any limitation of the general nature) is generally very large. For this reason, means have to be provided for specifying more precisely the data which is to be interchanged with other systems. Within the scope of the invention, this is preferably done by filtering.

For the filtering, the extractors provided by the OLTP-R/3 system and described in conjunction with FIG. 7 are used. In this context, a particular feature is that the use of the extractor master provides a standardized interface to the MS system via which all enquiries in the MS system pass. The data are thus filtered by virtue of the destination data base system MS transmitting the requests for data that it requires via a standardized interface to extractors which are implemented in the source system OLTP-R/3.

Another problem is that of permitting initial download in a reasonable time. This is not possible using the means which are usually available in back-office systems, because these means are not equipped for rapid transmission of very large volumes of data. This problem is preferably solved, within the scope of the invention, by providing the specific data containers called bulk-oriented BDocs which are explained in more detail above.

Finally, a problem of initial download is that of ensuring that the data transmitted to the destination data base system correspond to a precisely defined state of the source data base system at a defined instant (a snapshot). Conventionally, this problem is solved by blocking changes to the source data base system during initial download or—to the extent that changes are permitted—using special instruments of the source data base which, however, preclude any database independent operations in the initial download.

To solve this problem area, the invention proposes a procedure which is called online sync procedure below and is explained with reference to FIG. 12. In this case, the extractors implemented in the source system OLTP-R/3, which are addressed via the extractor master interface EM—controlled by filter definition stored in the destination system MS—, operate normally, reading and outputting in blocks, and are not aware of the dynamic data change in the source data base. The bulk of the data required by the destination system is thus transmitted on the path denoted by the arrow IL (initial load).

In parallel, however, the aforementioned delta handling is also executed by means of the results sender RS. This places changes which arise in the source system during initial download into a queue. In contrast to normal delta download operation, this queue is not unblocked, however, but is blocked over the duration of initial download (queue stop QS). When initial download has ended, the change queue is unblocked and the changes made during initial download are transmitted to the destination system MS via the delta download channel symbolized by the arrow DL (delta load). This results in a consistent "snapshot", in relation to the instant at which the initial download ended.

b) Delta Download

For the delta download function also, reference is made to the explanations given further above (particularly with reference to FIG. 5) and for the data merge procedure. The object in this case is to supply all systems connected to a source data base system A with respective changes in the course of operation after initial download.

The function is provided in two substeps:
  a) notifying the source data base system regarding changes made, and
  b) incorporating the change and editing it and then transferring it to the destination data base system for further processing.

Normally, change pointers are used for the purpose of notification about changes made. This has considerable disadvantages, however. First, it is necessary to provide the application of the source data base system with a change pointer for each possible change. This is usually not possible for all data objects, but is at the least very complex and is a critical cause of error. Secondly, changes are transferred only at prescribed time intervals.

To solve this problem area, the invention preferably uses event technology. Integrated into the routine for incorporating a change in the data base OLTP-DB of the source data base system is the creation of an event. The event distributor ED is used to call function modules maintaining a subscription for the event when the event occurs. These function modules include an appropriate module of the destination data base system (in FIG. 5, a component of the result save agent RSA). Hence, the OLTP-R/3 adapter of the MS system (in general terms, that is to say a module of the destination system) almost immediately receives information about any change in the source data base system which is relevant to the destination system.

The subsequent transmission of the change from the source data base system to the destination data base system is carried out using the filter criteria FD (FIG. 12) stored in the destination data base system, which has already been discussed. The data are then edited using the data merge procedure described above, and the procedure that has likewise been described above is used to generate a cross-system primary key.

Another particular feature of the data transfer is that (particularly in the case of the delta download) net-field determination, as described below, is used.

To minimize reciprocal overwriting of changes made by a large number of users accessing the same datasets independently, it is advantageous to transmit only the changed fields of the respective data records. This is called net-field transmission. ERP back-office systems, such as the OLTP-R/3 system, in particular, however, are generally able to communicate only on an "all-field" basis, i.e., they transmit only entire data records with all the field contents at once. The data is therefore transferred to the destination system MS on an all-field basis via the data channel DL (FIG. 12) if such a transfer has been triggered by the results sender RS. In accordance with one preferred embodiment of the invention, this disadvantage is overcome by virtue of the destination system, namely the data base service CDS for the consolidated data base CD, determining the actual changes at field level by comparison with the content of the consolidated data base CD, and entering only the actual changes for subsequent processing on a net-field basis.

The specific way in which this occurs is explained with reference to FIGS. 13 and 14.

To support the net-field transmission, all segments of the BDocs (i.e., of the data objects of the destination data base system) contain a field which reflects the changed fields. This field is called the send-bit field SBF. By way of example, it may be of the type RAW(32) and, in binary representation, each of its positions contains (expediently stored in HEX form) a "1", which corresponds to a field which has undergone a change. This allocation of the send-bit information SBF to the field information FIN is shown graphically in FIG. 13. Deletions are also indicated as changes. In the case shown, by way of example, the field content of fields 1 and 4 has been changed (to "A" and "C"), and the field content of fields 2 and 8 has been deleted. The field content of the additional field SBF comprises a relevant part R, whose number of bits corresponds to the number of fields, and a non-relevant part L, which is ignored.

If data records are transferred to the destination data base system on an all-field basis, there is an adjustment in line with the data base CD of the destination data base system MS. This adjustment is made in the data base service CDS of the data base CD and is shown graphically in FIG. 14. Therein, the data record D1 is an example of a data record transmitted on an all-field basis and having a changed field content "X". The data base service CDS compares the data record with the corresponding data record D1 stored in the data base CD and establishes that only the field with the content "X" has been changed. Accordingly, the data record D2 is generated, which contains only the changed information. The corresponding send bit has been set to "1". The rest of the field contents have been emptied.

c) Synchronization

Semantic integration in the context explained in the introduction means more than pure interchange of data between systems. Where possible, the way the application works needs to come close to the fundamental logic for processing the user data ("business logic"). The business logic is greatly reflected in the control data which is stored in the repository of the respective data base system and map the logic, such as value ranges, field, record and data base plausibilities. For this reason, semantic integration should also involve replication of the repository control information across the system. In the case of the OLTP-R/3 system, these are the 'customizing tables' (T tables). Changes to the customizing tables are indicated in the OLTP-R/3 system neither by change pointers nor as events, however. Accordingly, a replica of these data in a destination data base system such as the MS system will age quickly if there is no suitable update mechanism available.

In order to permit ongoing synchronization of the data state between a source system and a destination system in such cases too, the aforementioned "Request" and "Compare" components are used. The synchronization mechanism produced thereby is explained with reference to FIGS. 15 and 16.

The Request component works in a similar manner to the initial download, as already explained. In order to download arbitrary business objects from the OLTP-R/3 system to the MS system, a module is used which is called a general extractor GE and is addressed by means of the extractor master EM on the basis of the filter definition FD.

Before the data downloaded in this manner is incorporated into the consolidated data base CD, the compare module, denoted by COMP in FIG. 15, is called, and this compare module compares the downloaded data with the data already existing in the data base CD and allows only data which has actually been changed to pass. In addition, it creates deletion orders for data which are no longer available in the original.

The algorithm used for this purpose can be explained with reference to FIG. 16. In a preparatory pass, the data received from the OLTP-R/3 system and the respective corresponding table from the data base CD is first provided in a respective memory location S2 and S1. When the corresponding table is selected from the data base CD, the data is filtered such that all the records which are contained only in the MS system (in FIG. 16, the records m1 and m2) are not selected. The other records also contain fields with MS-specific data. A further restriction for the data transmission ensures that the memory area S1 provides only data which is also available in the OLTP-R/3 system.

The contents of the memory areas S1 and S2 are subsequently compared by choosing one of the tables as reference, with this table being passed through in steps from its beginning to the end, and the corresponding entries being sought in the other table. In this case, it is advantageous, for performance reasons, for the reference chosen to be that memory table which contains the smaller number of entries (in FIG. 16, the table in the memory area S1). On the basis of the result of the comparison, appropriate actions are taken, such as:

Create new entries: "I"

Create net-field entries: "U"

Create deletion order: "D"

The algorithm can be represented as follows:

```
For all entries in S1 {
    If available in S2 {
        Create new entries ("I") for all previous S2
        entries not affected
        If changes
            Create net-field entries ("U")
    { else
        Create deletion order ("D")
}
```

4. Upload

As explained, it is a fundamental element of semantic integration of data base systems for it to be possible to make data entries and changes not only in one, but in a plurality or all of the interlinked data base systems. By way of example, it must thus be possible for sales representatives to input new data (for example a new order) into their portable computers at the customer's and for this change in the dataset to be preserved in the data base OLTP-DB.

Changes at the level of the mobile clients are registered by the transaction layer described in conjunction with FIG. 2, via which layer the mobile clients communicate with the MS system and their own local data base LD. When the portable computer is linked to the middleware server MS, the changed data are transferred as BDocs and are also transmitted to the back-office system OLTP-R/3. The components used for this purpose have been explained with reference to FIG. 5, and the data merge procedure taking place in the course of this has been explained with reference to FIG. 11.

A fundamental requirement for such a data upload is the development of a suitable conflict resolution strategy in order to prevent conflicts between the data entered or changed at various locations. The definition of "data maintenance ascendencies", which permits data to be changed only at particular locations in the composite system in each case, would not afford adequate integration. Even the LOW (last one wins) procedure used in many applications is not suitable for such a composite system which includes the data of an ERP back-office system.

For this reason, the present invention uses a novel conflict resolution strategy called LSC (leading system concept). The LSC procedure defines a managing system (FS) for each data object. All the other systems in the composite system are managed systems (GS). Each change in a GS must first be confirmed by the FS. A fundamental difference as compared with customary confirmation functions is that the function in this case crosses the application boundaries and serves to resolve conflicts between systems whose structures are not compatible.

Implementation of the LSC procedure requires special functions which are explained below.

In the example described here, the MS system is the managed system for all data objects. The managed system must be able to satisfy the following requirements:

The user must be able to detect the confirmation status (accepted, rejected, open) of the data at all times when they are displayed.

The user must be able to access his original values again if the data which he has changed is rejected.

The data object must not be blocked until a change has been confirmed, i.e., a plurality of changes to the same data object which are to be checked must be able to be made in succession without having to wait for the end of the previous check.

Data consistency in the entire composite system must be assured.

These requirements can be satisfied, in particular, by two function modules, called a pending counter (PC) and an inbox (IB).

The pending counter is a Char(4) field which can be found in any table involved in the data interchange (that is to say in any segment of the BDocs). This field is used to define the current confirmation state of the data. It forms a control flag which is evaluated by the application program in order to visualize the confirmation state of the data—for example on the screen.

The pending counter has the following forms:

"0": OK

P<n>: Pending (=open, not yet confirmed), where <n> increments the number of changes as a reference counter F<n>: Data record is in the error state The pending counter is incremented with each change and is decremented again upon confirmation by the managing system, until it is at "0" again. It is also decremented in the case of rejection, but an "F", is set instead of a "P".

To assure data consistency in the entire system, it is necessary for the original data state to be restored in the managed system if changes are not accepted (roll back). This is preferably done by virtue of the managing system (in the example, the OLTP-R/3 system) sending back the "image of the previous state" (before image) BI contained in the data object—as explained above—to the managed system at the same time as the rejection. A roll back can thus be effected by introducing the original state.

However, a disadvantage of this procedure is that all the user's changes in the respective data object are thus overwritten. If, by way of example, an order containing more than 100 items is involved which has possibly been rejected on account of a comparatively slight inconsistency, it is necessary for the data of the incorrect, and therefore unaccepted, data object to be made available again to the user who made the change. This is done using the inbox. The user can then conveniently adjust the entries and make them available again.

The operation of the pending counter and of the in box is shown in FIG. 17 with the aid of an example. In this case, the column headed LD symbolizes the content of the local data base with a respective field indicating the status of the pending counter PC, the primary key field K and the three data fields D.

In a first step, the content of the middle data field is changed. The BDoc conveying the information to the OLTP-R/3 system contains only the changed information item "2".

In the next step, two data fields are changed. The changed information items "B" and "3" are likewise transmitted as a BDoc. In the fourth step, confirmation of the first change is received, and confirmation of the second change is received in the fifth step. The pending counter PC indicates the respective confirmation state.

In the sixth step, a change which is unacceptable to the managing system is made, which is marked by a symbol in the form of a star. This change is rejected as error message "E", which means that the state before this change is restored in the eighth step. At the same time, the "rejected" changed state is placed into the inbox, so that the user can continue to work on it. A permissible change in the first field, which has been made in the meantime in the seventh step, is confirmed in the ninth step.

The before images are created under the control of the flow control of the MS system using a reject service. This reject service uses a flag which is set in the header of the BDoc to check whether the entire BDoc has been confirmed or rejected. In the case of rejection, the reject service extracts the entire data of the BDoc from the consolidated data base CD and makes it available within the BDoc as before images. If the entire BDoc is accepted, then the reject service checks its partial segments for their status. If a partial segment is rejected, its contents are likewise extracted from the consolidated data base CD and are made available in the before images.

The managing system must be capable, within the context of the LSC procedure, of checking inbound data and rejecting it if required. This function is usually implemented in back-office systems. Other functions which are also important in this context have already been described. These include data complementation in the case of acceptance, which has been described in the context of the data merge procedure, and transmission of the primary key of the managing system, which has likewise already been described.

5. Extension and Variations of the Composite System Illustrated

The example illustrated has, in essence, described data interchange between the middleware server MS, which forms the central computing unit in a CRM front-office system, and the OLTP-R/3 system as an example of an ERP back-office system.

The procedures and algorithms described can also be applied to other cases, however. In particular, the middleware system MS can use the procedure described to communicate with other, different data base systems, whose logical structure has overlaps, at least to an extent, at the level of the processed objects, whereas their structure is incompatible at the level of program implementation. By using the procedures described, the MS system can thus be used as a switching system between different external data base systems.

What is claimed is:

1. A process for interchanging data from a source database system to a destination database system, each of the database systems providing unique identification of stored data objects using respective primary-key creation logic to generate a respective system-specific primary key for each data object, the primary-key creation logics of the two database systems being independent of one another, the process comprising:
   a) comparing a source database system primary key for a data object to be transported from the source database system to the destination database system with a key mapping table in which are stored source system primary keys for all data objects for which both source database system primary keys and corresponding destination database system primary keys have been generated;
   b) responsive to a determination that the source database system primary key is not in the key mapping table, automatically creating a destination database system primary key using a primary key generator, storing the destination database system primary key in the data object and in the key mapping table together with the source database system primary key; and
   c) responsive to a determination that the source database system primary key of the source database system is found in the key mapping table, storing the corresponding primary key of the destination database system in the data object.

2. The process according to claim 1, wherein the primary key generator is integrated in the destination database system.

3. The process according to claim 1, wherein the destination database system primary key is not a component part of the data stored in the database of the source database system.

4. The process according to claim 2, wherein the destination database system primary key not a component part of the data stored in the database of the source database system.

5. The process according to claim 1, wherein, if the data object is transferred back to the source database system, the destination database system primary key is removed from the data object and stored.

6. The process according to claim 1, wherein the source database system comprises an OLTP-R/3 system.

7. The process according to claim 1, wherein the destination database system comprises a middleware server system.

8. A process comprising updating, as a result of changes which have been made in a dataset in a first database system, a dataset in a second database system, the dataset of the first database system containing both non-relevant data which is not relevant to the second database system and relevant data relevant to the second database system, the data in the database systems being processed in the form of data objects, each data object containing a system-specific primary key specific to the system processing the data object, the data in the second database system being stored with the system-specific primary keys of the first and second database systems, wherein the updating comprises:
   a) removing from a first of the data objects the data which is not relevant to the second database system;
   b) transferring the first data object from the first database system to the second database system;
   c) creating a key which is specific to the second database system, and including the created key with the first data object; and
   d) putting the resulting data object into a storage routine of the second database system and storing the data contained in the data object in the database of the second database system.

9. The process according to claim 8, wherein, before putting the first data object into the storage routine, the data record of the data object is complemented with additional values that correspond to the dataset of the second database system.

10. The process of claim 8 wherein the first database system is an OLTP-R/3 system and the second system is a middleware server system.

11. A process comprising updating a dataset in a first database system as a result of changes made in a dataset in a second database system, the dataset of the second database system containing both data not relevant to the first database system and data relevant to the first database system, the data in the database systems being process in the form of data objects which each contain a system-specific primary key for the respective system in which the data object is stored, and the data being stored in the first database system only with the system-specific primary key therefore, wherein the updating comprises:
   a) removing the data which are not relevant to the first database system from the data object, and storing these data in the second database system;
   b) transferring the data object from the second database system to the first database system;
   c) removing the system-specific key for the second database system from the data object, and storing the removed key in the first database system; and
   d) putting the resulting data object into a storage routine of the first database system, and storing the data contained in the data object in database of the first database system.

12. The process according to claim 11, wherein, before being put into the storage routine, the data record of the data object is complemented with additional values which correspond to the dataset of the first database system.

13. The process according to claim 11, and further comprising:
   e) triggering an event as a result of the storage of the data contained in the data object in the database of the first database system;
   f) receiving the event in a component of the second database system which has subscribed to the event;
   g) adding the stored key specific to the database system;
   h) removing data which are specific to the first database system;
   i) transferring said removed data to the second database system in the form of a data object which contains the data which are relevant to both database systems, the key specific to the second database system, and the key specific to the first database system; and
   j) adding the data which are not relevant to the first database system and storing said data in the second database system.

14. The process of claim 13, wherein the first database system is an OLTP-R/3 system.

15. A computer-readable storage medium having stored thereon instructions causing a computer system to perform a process for interchanging data from a source database system to a destination database system, wherein each of the database systems provide unique identification of stored data objects using respective primary-key creation logic to generate a respective system-specific primary key for each data object, the primary-key creation logics of the two database systems being independent of one another, the process comprising:

a) comparing a source database system primary key for a data object to be transported from the source database system to the destination database system with a key mapping table in which are stored source system primary keys for all data objects for which both source database system primary keys and corresponding destination database system primary keys have been generated;

b) responsive to a determination that the source database system primary key is not in the key mapping table, automatically creating a destination database system primary key using a primary key generator, storing the destination database system primary key in the data object and in the key mapping table together with the source database system primary key; and c) responsive to a determination that the source database system primary key of the source database system is found in the key mapping table, storing the corresponding primary key of the destination database system in the data object.

16. The computer-readable storage medium according to claim 15, wherein the primary key generator is integrated in the destination database system.

17. The computer-readable storage medium according to claim 15, wherein the destination database system primary key is not a component part of the data stored of the source database system.

18. The computer-readable storage medium according to claim 16, wherein the destination database system primary key is not a component part of the data stored the source database system.

19. The computer-readable storage medium according to claim 15, wherein, if the data object is transferred back to the source database system, the destination database system primary key is removed from the data object and stored.

20. The computer-readable storage medium according to claim 15, wherein the source database system comprises an OLTP-R/3 system.

21. The computer-readable storage medium according to claim 15, wherein the destination database system comprises a middleware server system.

22. A computer-readable storage medium having stored thereon instructions causing a computer system to perform a process comprising updating, as a result of changes which have been made in a dataset in a first database system, a dataset in a second database system, the dataset of the first database system containing both non-relevant data which is not relevant to the second database system and relevant data relevant to the second database system, the data in the database systems being processed in the form of data objects, each data object containing a system-specific primary key specific to the system processing the data object, the data in the second database system being stored with the system-specific primary keys of the first and second database systems, wherein the updating comprises:

a) removing from a first of the data objects the data which is not relevant to the second database system;

b) transferring the first data object from the first database system to the second database system;

c) creating a key which is specific to the second database system, and including the created key with the first data object; and d) putting the resulting data object into a storage routine of the second database system and storing the data contained in the data object in database of the second database system.

23. The computer-readable storage medium according to claim 22, wherein, before putting the first data object into the storage routine, the data record of the data object is complemented with additional values that correspond to the dataset of the second database system.

24. The computer-readable storage medium of claim 22 wherein the first database system is an OLTP-R/3 system and the second system is a middleware server system.

25. A computer-readable storage medium having stored thereon instructions causing a computer system to perform a process comprising updating a dataset in a first database system as a result of changes made in a dataset in a second database system, the dataset of the second database system containing both data not relevant to the first database system and data relevant to the first database system, the data in the database systems being processed in the form of data objects which each contain a system-specific primary key for the respective system in which the data object is stored, and the data being stored in the first database system only with the system-specific primary key therefore, wherein the updating comprises:

a) removing the data which are not relevant to the first database system from the data object, and storing these data in the second database system;

b) transferring the data object from the second database system to the first database system;

c) removing the system-specific key for the second database system from the data object, and storing the removed key in the first database system; and d) putting the resulting data object into a storage routine of the first database system, and storing the data contained in the data object in the database of the first database system.

26. The computer-readable storage medium according to claim 25, wherein, before being put into the storage routine, the data record of the data object is complemented with additional values which correspond to the dataset of the first database.

27. The computer-readable storage medium according to claim 25, and further comprising:

e) triggering an event as a result of the storage of the data contained in the data object in the database of the first database system;

f) receiving the event in a component of the second database system which has subscribed to the event;

g) adding the stored key specific to the database system;

k) removing data which are specific to the first database system;

l) transferring said removed data to the second database system in the form of a data object which contains the data which are relevant to both database systems, the key specific to the second database system, and the key specific to the first database system; and m) adding the data which are not relevant to the first database system and storing said data in the second database system.

28. The computer-readable storage medium of claim 27, wherein the first database system is an OLTP-R/3 system.

29. A database network system comprising:

a source database system and a destination database system, each of the database systems providing unique identification of stored data objects using respective primary-key creation logic to generate a respective system-specific primary key for each data object, the primary-key creation logics of the two database systems being independent of one another;

said database network system comparing a source database system primary-key for a data object to be transported from the source database system to the destination database system with a key mapping table in which are stored source system primary keys for all data objects for which both source database system primary keys and corresponding destination database system primary keys have been generated;

said database network system, responsive to a determination that the source database system primary key is not in the key mapping table, automatically creating a destination database system primary key using a primary key generator, storing the destination database system primary key in the data object and in the key mapping table together with the source database system primary key; and said database network system, responsive to a determination that the source database system primary key of the source database system is found in the key mapping table, storing the corresponding primary key of the destination database system in the data object.

30. The database network system according to claim 29, wherein the primary key generator is integrated in the destination database system.

31. The database network system according to claim 29, wherein the destination database system primary key is not a component part of the data stored in the database of the source database system.

32. The database network system according to claim 30, wherein the destination database system primary key not a component part of the data stored in the database of the source database system.

33. The database network system according to claim 29, wherein, if the data object is transferred back to the source database system, the destination database system primary key is removed from the data object and stored.

34. The database network system according to claim 29, wherein the source database system comprises an OLTP-R/3 system.

35. The database network system according to claim 29, wherein the destination database system comprises a middleware server system.

36. A database network system comprising:

first and second database systems each having a respective dataset;

the dataset of the first database system containing both non-relevant data which is not relevant to the second database system and relevant data relevant to the second database system;

the database systems processing data in the form of data objects, each data object containing a system-specific primary key specific to the system processing the data object, the data in the second database system being stored with the system-specific primary keys of the first and second database systems;

said database network updating the dataset of the first database system as result of changes which have been made in the dataset of the second database system by a) removing from a first of the data objects the data which is not relevant to the second database system;

b) transferring the first data object from the first database system to the second database system;

c) creating a key which is specific to the second database system, and including the created key with the first data object, and d) putting the resulting data object into a storage routine of the second database system and storing the data contained in the data object in the database of the second database system.

37. The database network system according to claim 36, wherein, before putting the first data object into the storage routine, the data record of the data object is complemented with additional values that correspond to the dataset of the second database system.

38. The database network system of claim 36 wherein the first database system is an OLTP-R/3 system and the second system is a middleware server system.

39. A database network system comprising:

first and second database systems each having a respective dataset, the dataset of the second database system containing both data not relevant to the first database system and data relevant to the first database system, the data in the database system being processed in the form of data objects which each contain a system-specific primary key for the respective system in which the data object is stored, and the data being stored in the first database system only with the system-specific primary key therefore, the database network system updating the dataset in the first database system as a result of changes made in the dataset in the second database system by a) removing the data which are not relevant to the first database system from the data object, and storing these data in the second database system;

b) transferring the data object from the second database system to the first database system;

c) removing the system-specific key for the second database system from the data object, and storing the removed key in the first database system; and d) putting the resulting data object into a storage routine of the first database system, and storing the data contained in the data object in the database of the first database system.

40. The database network system according to claim 39, wherein, before being put into the storage routine, the data record of the data object is complemented with additional values which correspond to the dataset of the first database system.

41. The database network system according to claim 39, wherein the update is accomplished by:

e) triggering an event as a result of the storage of the data contained in the data object in the database of the first database system;

f) receiving the event in a component of the second database system which has subscribed to the event;

g) adding the stored key specific to the database system;

n) removing data which are specific to the first database system;

o) transferring said removed data to the second database system in the form of a data object which contains the data which are relevant to both database systems, the key specific to the second database system, and the key specific to the first database system; and p) adding the data which are not relevant to the first database system and storing said data in the second database system.

42. The database network system of claim 41, wherein the first database system is an OLTP-R/3 system.

43. A process for interchanging data from a source database system to a destination database system, each of the database systems providing unique identification of stored data objects using respective primary-key creation logic to generate a respective system-specific primary key for each data object, the primary-key creation logics of the two database systems being independent of one another, the process comprising:

a) comparing a source database system primary key for a data object to be transported from the source database system to the destination database system with a key mapping table in which are stored source system primary keys for all data objects for which both source database system primary keys and corresponding destination database system primary keys have been generated;

b) responsive to a determination that the source database system primary key is not in the key mapping table, automatically creating a destination database system primary key using a primary key generator, storing the destination database system primary key in the data object and in the key mapping table together with the source database system primary key; and c) responsive to a determination that the source database system primary key of the source database system is_found in the key mapping table, storing the corresponding primary key of the destination database system in the data object, wherein the destination database system comprises a middleware server system.

44. A computer-readable storage medium having stored thereon instructions causing a computer system to perform a process for interchanging data from a source database system to a destination database system, wherein each of the database systems provide unique identification of stored data objects using respective primary-key creation logic to generate a respective system-specific primary key for each data object, the primary-key creation logics of the two database systems being independent of one another, the process comprising:

a) comparing a source database system primary key for a data object to be transported from the source database system to the destination database system with a key mapping table in which are stored source system primary keys for all data objects for which both source database system primary keys and corresponding destination database system primary keys have been generated;

b) responsive to a determination that the source database system primary key is not in the key mapping table, automatically creating a destination database system primary key using a primary key generator, storing the destination database system primary key in the data object and in the key mapping table together with the source database system primary key; and c) responsive to a determination that the source database system primary key of the source database system is_found in the key mapping table, storing the corresponding primary key of the destination database system in the data object, wherein the destination database system comprises a middleware server system.

45. A database network system comprising:

a source database system and a destination database system, each of the database systems providing unique identification of stored data objects using respective primary-key creation logic to generate a respective system-specific primary key for each data object, the primary-key creation logics of the two database systems being independent of one another;

said database network system comparing a source database system primary-key for a data object to be transported from the source database system to the destination database system with a key mapping table in which are stored source system primary keys for all data objects for which both source database system primary keys and corresponding destination database system primary keys have been generated;

said database network system, responsive to a determination that the source database system primary key is not in the key mapping table, automatically creating a destination database system primary key using a primary key generator, storing the destination database system primary key in the data object and in the key mapping table together with the source database system primary key; and said database network system, responsive to a determination that the source database system primary key of the source database system is_found in the key mapping table, storing the corresponding primary key of the destination database system in the data object, wherein the destination database system comprise a middleware server system.

* * * * *